US012626285B2

(12) United States Patent
Loar et al.

(10) Patent No.: US 12,626,285 B2
(45) Date of Patent: May 12, 2026

(54) SYSTEMS AND METHODS FOR GENERATING WRAPS AND REAL TIME PRICING INFORMATION THEREOF

(71) Applicant: Wrapmate Inc., Greenwood Village, CO (US)

(72) Inventors: Christopher Loar, Cherry Hills, CO (US); Jacob Atler Lozow, Lone Tree, CO (US); Shawn Anthony Holmes, Denver, CO (US)

(73) Assignee: Wrapmate Inc., Greenwood Village, CO (US)

( * ) Notice: Subject to any disclaimer, the term of this patent is extended or adjusted under 35 U.S.C. 154(b) by 332 days.

(21) Appl. No.: 18/250,329

(22) PCT Filed: Oct. 29, 2020

(86) PCT No.: PCT/US2020/057944
§ 371 (c)(1),
(2) Date: Apr. 24, 2023

(87) PCT Pub. No.: WO2022/093230
PCT Pub. Date: May 5, 2022

(65) Prior Publication Data
US 2023/0401621 A1    Dec. 14, 2023

(51) Int. Cl.
*G06Q 30/00* (2023.01)
*G06Q 30/0283* (2023.01)
*G06Q 30/0601* (2023.01)

(52) U.S. Cl.
CPC ..... *G06Q 30/0621* (2013.01); *G06Q 30/0283* (2013.01); *G06Q 30/0611* (2013.01)

(58) Field of Classification Search
CPC ........... G06Q 30/0621; G06Q 30/0283; G06Q 30/0611
See application file for complete search history.

(56) References Cited

U.S. PATENT DOCUMENTS 8,095,431 B1 * 1/2012 Ahluwalia ......... G06Q 30/0633
                                                              705/26.1
9,648,949 B1    5/2017 Penaflor
(Continued)

OTHER PUBLICATIONS

Moawad, Ayman, et al. "Explainable AI for a No-Teardown Vehicle Component Cost Estimation: A Top-Down Approach". Jun. 15, 2020. https://doi.org/10.48550/arXiv.2006.08828. (Year: 2020).*
(Continued)

*Primary Examiner* — Anand Loharikar
(74) *Attorney, Agent, or Firm* — Bradley Arant Boult Cummings LLP; Daniel E. Sineway, Esq.; Adam J. Thompson, Esq.

(57) ABSTRACT

The disclosed system provides a new platform that allows users to access installation target templates, powerful design software, and automated pre-production processes and enables them to create their own production-ready designs. Once a design is complete, the system directly connects the consumer to nearby service providers with the capabilities to complete the work. Importantly, the disclosed systems provide complete real-time pricing transparency. As a user manipulates a design or scrolls through service providers, they are presented with dynamic pricing. The disclosed system represents a novel end to end fully transactional consumer experience.

27 Claims, 11 Drawing Sheets

(56)                    References Cited

U.S. PATENT DOCUMENTS

| 10,846,534  | B1 * | 11/2020 | Furlan ..................... | G01C 21/20 |
| 2017/0076335 | A1 * | 3/2017 | Alexander .............. | G06T 19/20 |
| 2018/0374274 | A1 * | 12/2018 | Selvarajan .............. | G06T 15/04 |
| 2020/0043246 | A1 * | 2/2020 | Loar ..................... | G06T 15/005 |

OTHER PUBLICATIONS

International Search Report and Written Opinion mailed Jan. 28, 2021 for Application No. PCT/US2020/057944 (10 pp.).

* cited by examiner

<u>200</u>

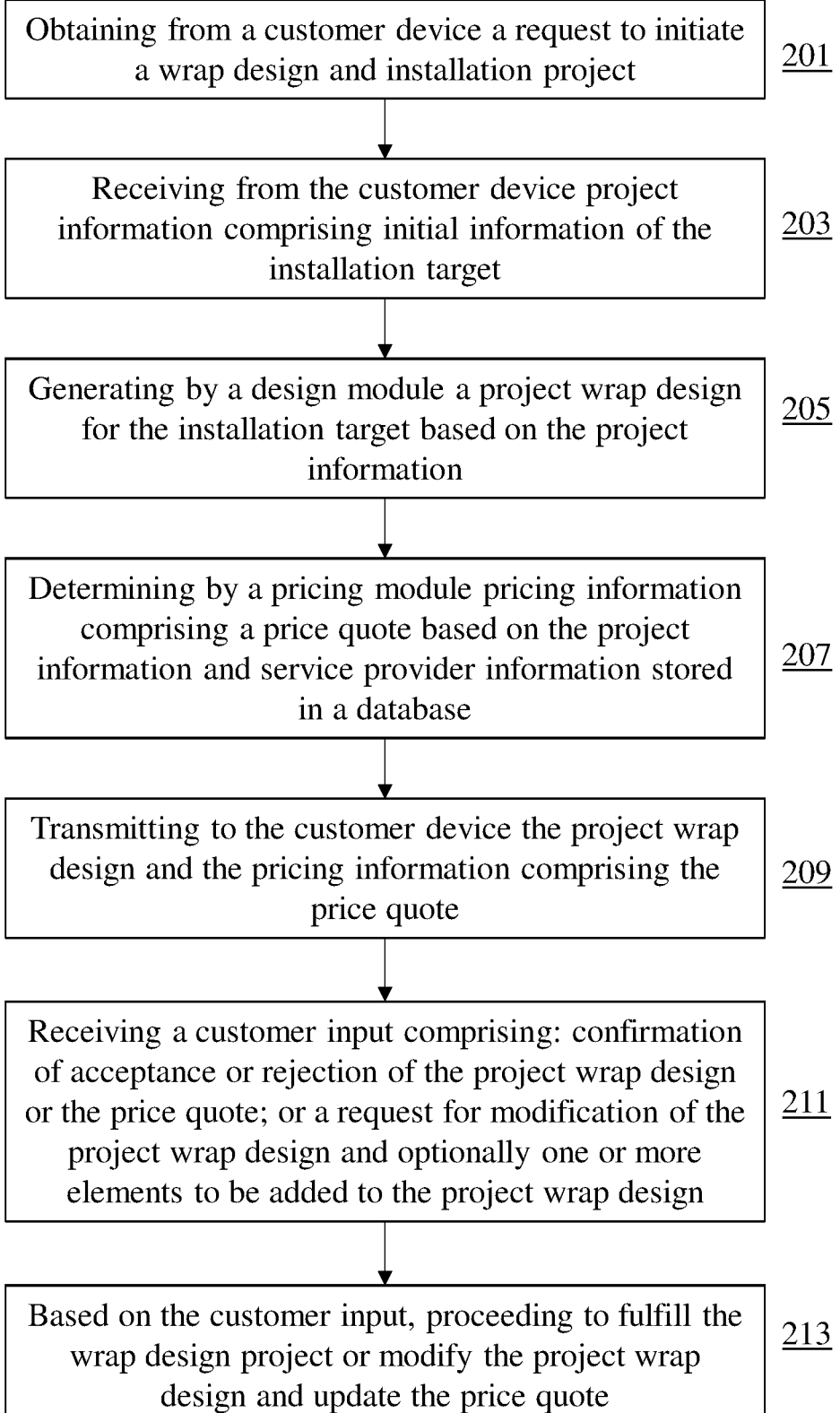

| Obtaining from a customer device a request to initiate a wrap design and installation project | <u>201</u> |

| Receiving from the customer device project information comprising initial information of the installation target | <u>203</u> |

| Generating by a design module a project wrap design for the installation target based on the project information | <u>205</u> |

| Determining by a pricing module pricing information comprising a price quote based on the project information and service provider information stored in a database | <u>207</u> |

| Transmitting to the customer device the project wrap design and the pricing information comprising the price quote | <u>209</u> |

| Receiving a customer input comprising: confirmation of acceptance or rejection of the project wrap design or the price quote; or a request for modification of the project wrap design and optionally one or more elements to be added to the project wrap design | <u>211</u> |

| Based on the customer input, proceeding to fulfill the wrap design project or modify the project wrap design and update the price quote | <u>213</u> |

FIG. 2

Dimensional and visual input method

Scaled Grid System

☐ Difficulty A     ▨ Difficulty B     ▦ Difficulty C

Real time Calculations
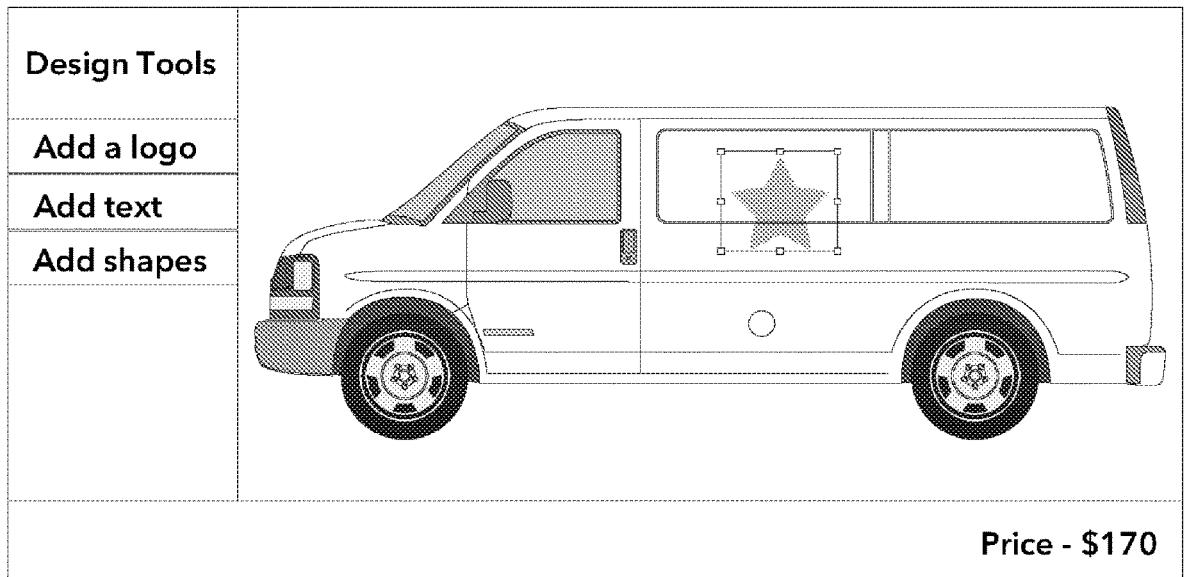
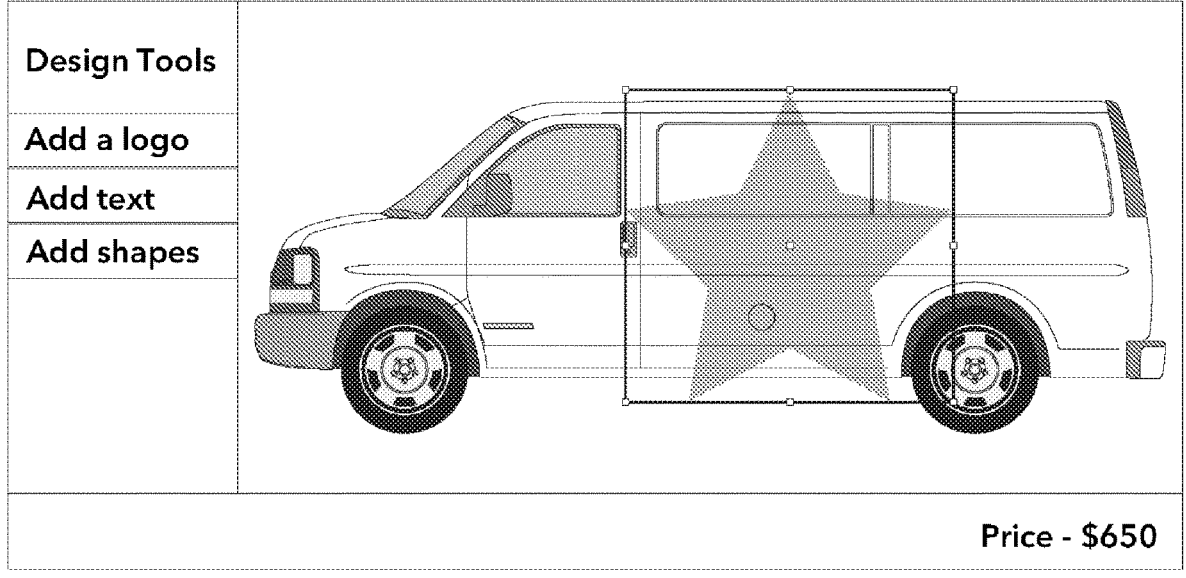
FIG. 6

Sheeting and Compiling System
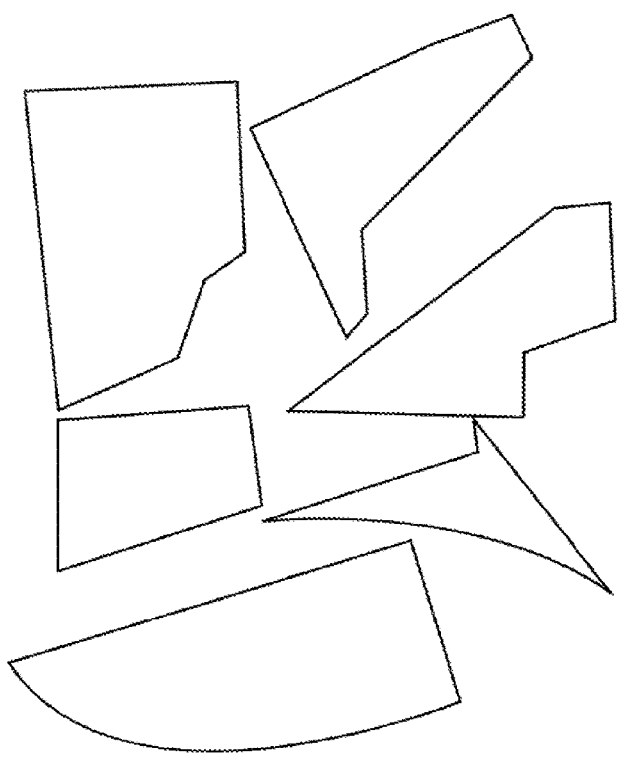
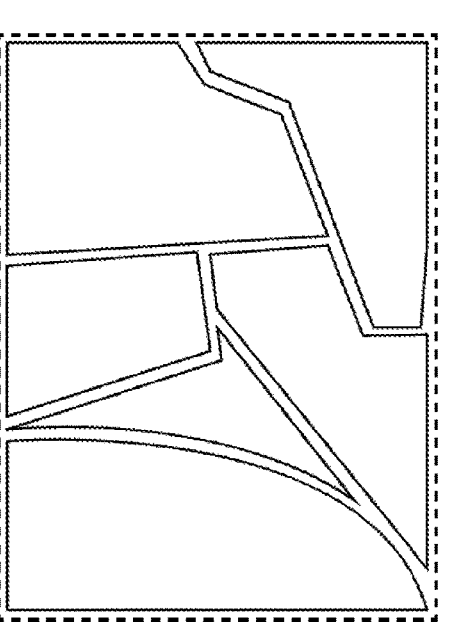
FIG. 8

Scale
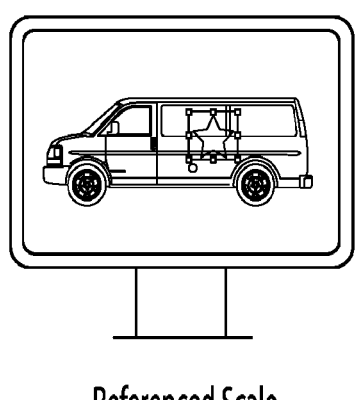
Referenced Scale
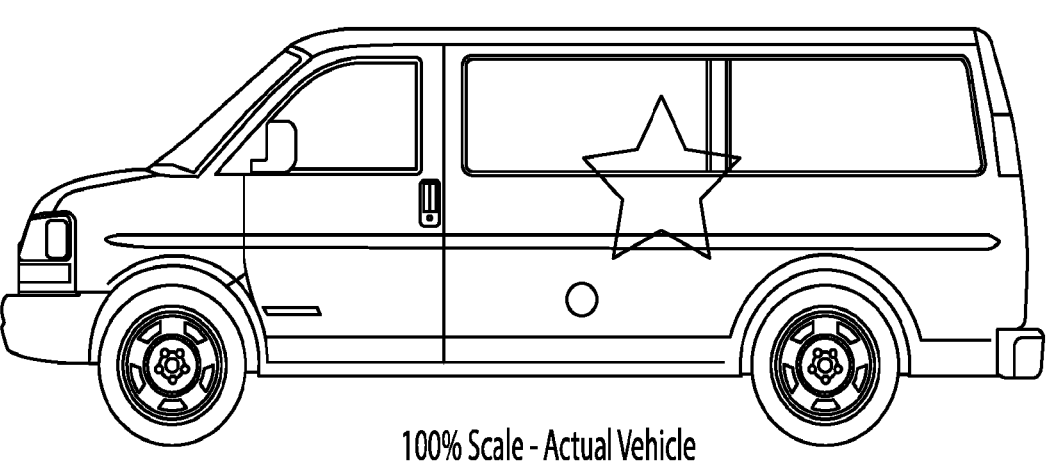
100% Scale - Actual Vehicle
FIG. 9

1000

SERVER SYSTEM    1010

SERVER 1012    DATA STORE 1014

1040

NETWORK
1030

1040

CLIENT SYSTEM    1020

SYSTEMS AND METHODS FOR GENERATING WRAPS AND REAL TIME PRICING INFORMATION THEREOF

CROSS-REFERENCE TO RELATED APPLICATIONS

This application is a U.S. national phase application under 35 U.S.C. § 371 of International Patent Application No. PCT/US2020/057944 filed Oct. 29, 2020, the disclosure of which is hereby incorporated by reference herein in its entirety.

FIELD OF THE INVENTION

This disclosure relates generally to methods and systems for automatically or interactively generating wraps for various objects, calculating real-time pricing information, and facilitating production and installation thereof.

BACKGROUND OF THE INVENTION

Wraps are typically used as a means to place advertisements or other graphic elements on vehicles, appliances, and architectural objects. Generally speaking, a wrap represents a flexible piece of material upon which a graphical image has been printed or otherwise applied. The wrap is applied to an installation target to cover it, either partially or completely, and thereby place the image of the wrap on a portion or entire exterior of the installation target.

The large format printing industry has been a marketing staple in this country and abroad for decades. One particularly significant format is custom wraps. A large portfolio of raw materials is available to consumers to customize and ultimately be installed on an installation target of their choice. Whether a consumer is a commercial business looking to cover their vehicle or building with information about their business or an individual looking to personalize their personal property, there is a path for them. However, the journey for these consumers and the service providers to complete a project has been hindered by several factors. For example, the composition of the cost of a particular project is determined by many factors not available to the consumer, such as intricacies of their installation target, the cost of raw materials, and the project design itself. Furthermore, most consumers are unable to meaningfully participate in the design process because they do not have access to specialized software, scaled dimensionally accurate digital representations of their installation target, and industry knowledge. In the meantime, service providers are looking for ways to expand their market and utilize idle time. These factors, amongst many others, have an impact on the total market size and customer perception of a transaction.

It is with these problems, among others, that aspects of the present disclosure were conceived.

SUMMARY OF THE INVENTION

This disclosure addresses the challenges mentioned above in a number of aspects, e.g., by providing methods and systems that allow customers to automatically or interactively generate wraps designs for various objects while providing real-time price quotes (e.g., final cost to get it produced) and ultimately schedule the production and installation of the customer designed wrap.

In one aspect, this disclosure provides a method for generating a wrap for an installation target. The method comprises: (a) obtaining from a customer via a customer device a request to initiate a wrap design and installation project; (b) receiving from the customer device project information comprising initial information of the installation target; (c) generating by a design module a project wrap design for the installation target based on the project information; (d) determining by a pricing module pricing information comprising a price quote for the wrap design and installation project based on the project information and service provider information, stored in a database, of one or more service providers capable of producing and installing the wrap; (e) transmitting to the customer device the project wrap design and the pricing information comprising the price quote; (f) receiving a customer input from the customer device, comprising: confirmation of acceptance or rejection of the project wrap design or the price quote; or a request for modification of the project wrap design and optionally one or more elements to be added to the project wrap design; and (g) if the customer input comprises the confirmation of acceptance, providing by a project fulfillment module the project wrap design to a service provider to fulfill the wrap design and installation project; or (h) if the customer input comprises the request for modification, modifying the project wrap design based on the request for modification and optionally the one or more elements; transmitting to the customer device the modified project wrap design and adjusted pricing information comprising an adjusted price quote; and repeating step (f).

In some embodiments, step (c) further comprises: determining whether a scaled dimensionally accurate digital representation for the installation target is available in a database; and if the scaled accurate dimensional representation is available, generating the project wrap design based on the scaled accurate dimensional representation; or if the scaled accurate dimensional representation is unavailable, acquiring additional information of the installation target from the customer device to generate a scaled dimensionally accurate digital representation for the installation target and generating the project wrap design based on the additional information.

In some embodiments, the additional information of the installation target comprises a customer input comprising dimensions of the installation target. In some embodiments, the additional information of the installation target comprises a measurement of dimensions of the installation target by a sensor on the customer device. In some embodiments, the sensor comprises a LiDAR sensor, a camera, a gyroscope, GPS, accelerometer, barometer, or a combination thereof.

In some embodiments, step (c) further comprises constructing a scaled dimensionally accurate model of the installation target based on the measurement by the sensor. In some embodiments, step (c) further comprises receiving and executing a customer operation on the project wrap design. In some embodiments, the customer operation comprises adding, scaling, rotating, cropping, dragging, or mirroring a design element or assigning a color for one or more portions of the project wrap design.

In some embodiments, the design element comprises a logo, a company name, contact information, a URL, a trademark, a slogan, or a combination thereof. In some embodiments, the design element is provided by an asset placement module.

In some embodiments, step (f) comprises receiving the one or more elements through a file upload module or through a query of a library containing various assets of the customer (e.g., a logo, a company name, contact information, a URL, a trademark, a slogan, or a combination thereof).

In some embodiments, step (c) further comprises generating the project wrap design that accounts for an excluded surface area on the installation target. In some embodiments, the excluded surface area is excluded from coverage of the wrap based on a legal requirement or not suitable for coverage by the wrap. In some embodiments, the excluded surface area comprises a physical surface of a window, a tire, an area near or below waterline. In some embodiments, the method further comprises choosing a desired wrap material based on the physical surface of the installation target.

In some embodiments, the method further comprises generating a print layout for the project wrap design based on design or size limitations of the desired wrap material or a printing device, thereby minimizing waste of the desired material and maximizing profit. In some embodiments, the method further comprises verifying a color of the project wrap design to ensure that the color is consistent with the color assigned by the customer, optionally based on Pantone coding or CMYK values. In some embodiments, the desired material comprises a plastic material.

In some embodiments, the method further comprises selecting the service provider based on proximity to the customer, accolades, a schedule of the service provider, or combinations thereof. In some embodiments, the service provider information comprises location, capability, capacity, service provider preferences, accolades, maximum material width suitable for production, or a combination thereof.

In some embodiments, the installation target comprises a vehicle, an appliance, or an architectural object. In some embodiments, the vehicle comprises a passenger vehicle, a recreational vehicle, or a commercial vehicle. In some embodiments, the architectural object comprises a window, a wall, a floor, a building, an exterior or an interior.

In some embodiments, step (d) comprises determining the pricing information by the pricing module based on the project information comprising complexity of the project wrap design, timeline requirement, size, location, desired material, condition or a combination thereof. In some embodiments, step (d) further comprises determining the pricing information based on a sum of installation costs of all grid segments constituting the project wrap design, wherein the project wrap design is segmented into one or more grid segments, wherein each of the one or more grid segment is assigned with a difficulty rating, and wherein the installation cost of each of the one or more segments is determined based on the difficulty rating thereof.

In some embodiments, the project information comprises year, make, model, trim, cab type, bed length, vehicle identification number, condition, or a combination thereof of the vehicle, or one or more surface types of the architectural object. The one or more surface types are selected from brick, glass, woods, flat, curved, and transparent. In some embodiments, the condition of the vehicle comprises existing surface condition, the presence of an OEM or aftermarket accessory, an existing surface attachment, or a combination thereof.

In some embodiments, the method further comprises: receiving an application from the service provider comprising the service provider information; reviewing the application and admitting the service provider; and storing the service provider information in the database. In some embodiments, the service provider information comprises a link to a calendar of the service provider comprising a schedule of the service provider.

In another aspect, this disclosure provides a system for generating a wrap for an installation target. The system comprises: an installation target identification module, a design module, a pricing module, a project fulfillment module, a database, a non-transitory, computer-readable memory, one or more processors, and a computer-readable medium containing programming instructions that, when executed by the one or more processors, cause the system to: (i) obtain from a customer via a customer device a request to initiate a wrap design and installation project; (ii) receive from the customer device project information comprising initial information of the installation target; (iii) generate by the design module a project wrap design for the installation target based on the project information; (iv) determine by the pricing module pricing information comprising a price quote for the wrap design and installation project based on the project information and service provider information, stored in a database, of one or more service providers capable of producing and installing the wrap; (v) transmit to the customer device the project wrap design and the pricing information comprising the price quote; (vi) receive a customer input from the customer device, comprising: confirmation of acceptance or rejection of the project wrap design or the price quote; or a request for modification of the project wrap design and optionally one or more elements to be added to the project wrap design; and (vii) if the customer input comprises the confirmation of acceptance, provide by the project fulfillment module the project wrap design to a service provider to fulfill the wrap design and installation project; or (viii) if the customer input comprises the request for modification, modify the project wrap design based on the request for modification and optionally the one or more elements; transmit to the customer device the modified project wrap design and adjusted pricing information comprising an adjusted price quote; and repeat step (vi).

In some embodiments, the system further comprises programming instructions, when executed by the one or more processors, causing the system to: determine, at step (iii), whether a scaled dimensionally accurate digital representation for the installation target is available in a database; and if the scaled accurate dimensional representation is available, generate the project wrap design based on the scaled accurate dimensional representation; or if the scaled accurate dimensional representation is unavailable, acquire additional information of the installation target from the customer device and generate a dimensional accurate digital representation of the installation target for the project wrap design based on the additional information.

In some embodiments, the additional information of the installation target comprises a customer input comprising dimensions of the installation target. In some embodiments, the additional information of the installation target comprises a measurement of dimensions of the installation target by a sensor on the customer device. In some embodiments, the sensor comprises a LiDAR sensor, a camera, a gyroscope, GPS, accelerometer, barometer, or a combination thereof.

In some embodiments, the system further comprises programming instructions, when executed by the one or more processors, causing the system to construct, at step (iii), a scaled three-dimensional model of the installation target based on the measurement(s) by the sensor.

In some embodiments, the system further comprises programming instructions, when executed by the one or more processors, causing the system to receive and execute, at step (iii), a customer operation on the project wrap design. In some embodiments, the customer operation comprises adding, scaling, rotating, cropping, dragging, or mirroring a design element or assigning a color for one or more portions of the project wrap design. In some embodiments, the design element comprises a logo, a company name, contact information, a URL, a trademark, a slogan, or a combination thereof. In some embodiments, the design element is provided by an asset placement module.

In some embodiments, the system further comprises programming instructions, when executed by the one or more processors, causing the system to receive, at step (vi), the one or more elements through a file upload module or through a query of a library.

In some embodiments, the system further comprises programming instructions, when executed by the one or more processors, causing the system to generate, at step (iii), the project wrap design that accounts for an excluded surface area on the installation target. In some embodiments, the excluded surface area is excluded from coverage of the wrap based on a legal requirement or not suitable for coverage by the wrap. In some embodiments, the excluded surface area comprises a physical surface of a window, a tire, an area near or below the waterline.

In some embodiments, the system further comprises programming instructions, when executed by the one or more processors, causing the system to choose a desired wrap material based on a physical surface of the installation target and/or the customer inputted requirements for durability and material lifespan.

In some embodiments, the system further comprises programming instructions, when executed by the one or more processors, causing the system to generate a print layout for the project wrap design based on design or size limitations of the desired wrap material or a printing device, thereby minimizing waste of the desired material and maximizing profit. In some embodiments, the desired material comprises a plastic material.

In some embodiments, the system further comprises programming instructions, when executed by the one or more processors, causing the system to verify the color of the project wrap design to ensure that the color is consistent with the color assigned by the customer, optionally based on Pantone coding or CMYK values.

In some embodiments, the system further comprises programming instructions, when executed by the one or more processors, causing the system to select the service provider based on proximity to the customer, accolades, a schedule of the service provider, or combinations thereof. In some embodiments, the service provider information comprises location, capability, capacity, service provider preferences, accolades, maximum material width suitable for production (e.g., maximal printable width, or a combination thereof.

In some embodiments, the installation target comprises a vehicle, an appliance, or an architectural object. In some embodiments, the vehicle comprises a passenger vehicle, a recreational vehicle, or a commercial vehicle and wherein the architectural object comprises a window, a wall, a floor, a building, an exterior or an interior.

In some embodiments, the system further comprises programming instructions, when executed by the one or more processors, causing the system to determine, at step (iv), the pricing information by the pricing module based on the project information comprising complexity of the project wrap design, timeline requirement, size, location, desired material, condition or a combination thereof.

In some embodiments, the system further comprises programming instructions, when executed by the one or more processors, causing the system to determine, at step (iv), the pricing information based on a sum of installation costs of all grid segments constituting the project wrap design, wherein the project wrap design is segmented into one or more grid segments, wherein each of the one or more grid segment is assigned with a difficulty rating, and wherein the installation cost of each of the one or more segments is determined based on the difficulty rating thereof.

In some embodiments, the project information comprises year, make, model, trim, cab type, bed length, vehicle identification number, condition, or a combination thereof of the vehicle, or one or more surface types of the architectural object. The one or more surface types are selected from brick, glass, woods, flat, curved, and transparent. In some embodiments, the condition of the vehicle comprises existing surface condition, the presence of an OEM or aftermarket accessory, an existing surface attachment, or a combination thereof.

In some embodiments, the system further comprises programming instructions, when executed by the one or more processors, causing the system to: receive an application from the service provider comprising the service provider information; review the application and admitting the service provider; and store the service provider information in the database. In some embodiments, the service provider information comprises a calendar of the service provider comprising a schedule of the service provider.

The foregoing summary is not intended to define every aspect of the disclosure, and additional aspects are described in other sections, such as the following detailed description. The entire document is intended to be related as a unified disclosure, and it should be understood that all combinations of features described herein are contemplated, even if the combination of features are not found together in the same sentence, or paragraph, or section of this document. Other features and advantages of the invention will become apparent from the following detailed description. It should be understood, however, that the detailed description and the specific examples, while indicating specific embodiments of the disclosure, are given by way of illustration only, because various changes and modifications within the spirit and scope of the disclosure will become apparent to those skilled in the art from this detailed description.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings, the like reference characters refer to the same parts throughout the different views. The drawings depict only typical embodiments of the present disclosure and, therefore, are not to be considered limiting in scope.

FIG. 2 is a flow chart showing a process for generating a wrap design and a real-time price quote for a wrap design project.

FIG. 6 is a set of diagrams showing a graphic-user interface (GUI) for customized wrap design and real-time calculation of pricing information.

FIG. 8 is a set of diagrams showing an example sheeting and compiling system.

FIG. 9 is a diagram showing an example wrap displayed at a reference scale and installed on a vehicle.

DETAILED DESCRIPTION OF THE INVENTION

Figure 1:
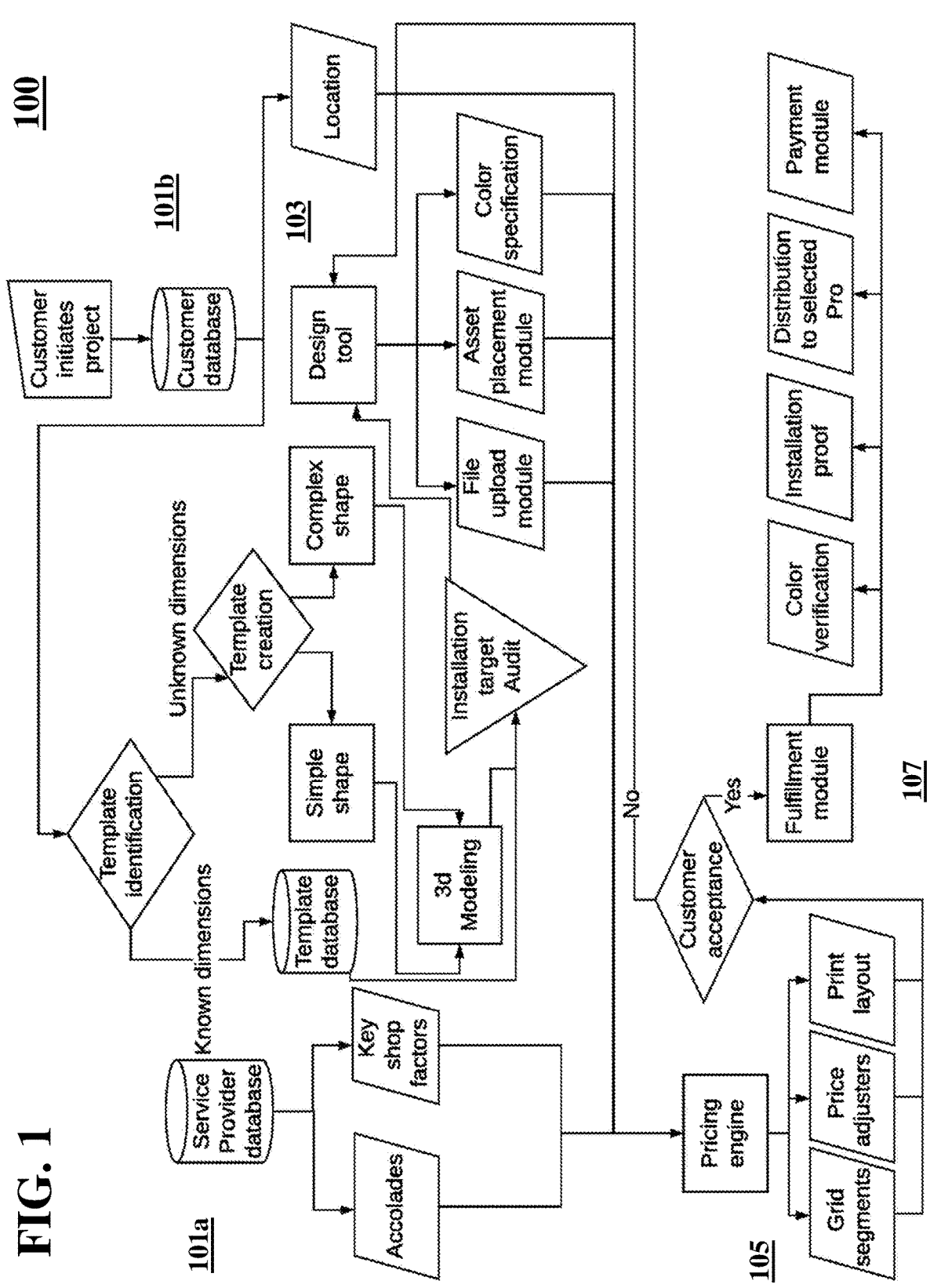
FIG. 1 is a diagram showing an example system for generating a wrap for an installation target.

The disclosed system provides a new platform that allows users to access installation target templates, powerful design software, and automated pre-production processes and enables them to create their own production-ready designs. Once a design is complete, the system directly connects the consumer to nearby service providers with the capabilities to complete the work. Importantly, the disclosed systems provide complete real-time pricing transparency. As a user manipulates a design or scrolls through service providers, they are presented with dynamic pricing. The disclosed system represents a novel end-to-end fully transactional consumer experience.

A. Systems for Generating Wraps

In one aspect, this disclosure provides a system for generating a wrap for an installation target. The system comprises: an installation target identification module, a design module, a pricing module, a project fulfillment module, a database, a non-transitory, computer-readable memory, one or more processors, and a computer-readable medium containing programming instructions that, when executed by the one or more processors, cause the system to: (i) obtain from a customer via a customer device a request to initiate a wrap design and installation project; (ii) receive from the customer device project information comprising initial information of the installation target; (iii) generate by the design module a project wrap design for the installation target based on the project information; (iv) determine by the pricing module pricing information comprising a price quote for the wrap design and installation project based on the project information and service provider information, stored in a database, of one or more service providers capable of producing and installing the wrap; (v) transmit to the customer device the project wrap design and the pricing information comprising the price quote; (vi) receive a customer input from the customer device, comprising: confirmation of acceptance or rejection of the project wrap design or the price quote; or a request for modification of the project wrap design and optionally one or more elements to be added to the project wrap design; and (vii) if the customer input comprises the confirmation of acceptance, provide by the project fulfillment module the project wrap design to a service provider to fulfill the wrap design and installation project; or (viii) if the customer input comprises the request for modification, modify the project wrap design based on the request for modification and optionally the one or more elements; transmit to the customer device the modified project wrap design and adjusted pricing information comprising an adjusted price quote; and repeat step (vi).

In some embodiments, the system further comprises programming instructions, when executed by the one or more processors, causing the system to: determine, at step (iii), whether a scaled accurate dimensional representation for the installation target is available in a database; and if the scaled accurate dimensional representation is available, generate the project wrap design based on the scaled accurate dimensional representation; or if the scaled accurate dimensional representation is unavailable, acquire additional information of the installation target from the customer device and generate the project wrap design based on the additional information.

Referring now to FIG. 1, there is provided an example system 100 for generating a wrap and a real-time price quote for a wrap design project on an installation target. The installation target can be any object. Examples of the installation target include, without limitation, vehicle (e.g., passenger vehicles, commercial vehicles, recreational vehicles, cars, vans, trucks, trailers, buses, mac-trucks, semi's, and the like), appliance (e.g., refrigerators, shelving, desks, monitors, computers, and cabinets), architectural object (e.g., interior, exterior, wall, roof, window, and door), vessel (e.g., ship, boat), jet ski, kayak, canoe, etc. In some embodiments, the system may include one or more databases (e.g., service provider database 101a, customer database 101b), a design module 103 (also referred to as a design tool), a pricing module 105 (also referred to as a pricing engine), a fulfillment module 107.

a. Databases Storing Service Provider or Customer Information

The databases 101a and 101b are respectively populated with data from two primary user types: service providers and customers. At the project level, a variety of data points from both user types are used to calculate the real-time price (also referred to as dynamic price calculation) within the pricing module 105.

Service Provider Information

Database 101a may store service provider information comprising location, capability, accolades, maximum printable width (or raw material production width), or a combination thereof. The service provider information can be used to determine if a particular service provider is suitable for a new wrap design project. For example, based upon the capabilities of service providers, they can be designated as appropriate or not for a particular project. The capacity information may include the types and models of production equipment (e.g., wrap printers, laminators, plotters) of a service provider, types and availability of raw wrap materials, ability to carry out installation of wraps on an installation target. The database 101a may include capabilities of hundreds of shops in or near to a location to determine if they are an acceptable fit for a given project type. Examples of project types may include, without limitation, vehicles (e.g., passenger vehicles, commercial vehicles, recreational vehicles, cars, vans, trucks, trailers, buses, mac-trucks, semis, and the like), appliances (e.g., refrigerators, shelving, desks, monitors, computers, and cabinets) and architectural objects (e.g., interior, exterior, wall, roof, window, and door).

Once a specific service provider has been deemed as an appropriate fit for a particular wrap design project, the service provider information can be used to calculate a price quote for the wrap design project. In other words, system 100 determines the real-time price information of a wrap design project not only based on the nature of the wrap design itself (e.g., material, size, color, add-on elements, difficulty in installation), but also based on the information of a service provider selected to fulfill the wrap design production, including, for example, printing, laminating, plotting, weeding, cutting, the wrap and installing it on the installation target. For example, based on location, capabilities, and accolades of the selected service provider, a dynamic price adjuster can be added in real-time to calculate price quotes for a project wrap design during its creation. In addition, system 100 also uses the service provider information to optimize the installation instructions for fulfillment of the wrap design project, before providing them to a service provider, for example, to minimize the waste of wrap materials and maximize the profit.

Location-Based Project Premium

Due to the significant variation in the cost of running a business throughout the country, the system 100 also takes into account the locality of the selected service provider and/or the installation target. By way of example, the system 100 may calculate the location adjuster based on a cost of living index that covers many geographic areas throughout the country. The system 100 may identify the geographic area with the lowest cost of living as a reference and assign it a zero percent price adjuster. The system 100 will then calculate a percent price adjuster (e.g., percent increment with respect to the reference zero percent price adjuster) for other geographic areas based on their respective cost of living indices.

As described above, the location (e.g., shop location) of a service provider is also an important factor for the system 100 to select an appropriate service provider to fulfill a wrap project. For example, system 100 may allow a customer to set a limit of distance between the installation target and the shop location of a service provider. If the distance limit is set, the system 100 will only select the service providers within the distance limit to fulfill the wrap project.

Accolades

Recognitions are another factor considered by system 100 in selecting a service provider and/or determining the price information for a wrap design production. It is common for service providers within the industry to obtain any number of recognitions, e.g., accolades or certifications. Such recognitions generally provide much higher assurance of quality for all aspects of their work products and, in some cases, a lengthened warranty period. As a result of each accolade or certification recognized by the system 100, a shop may be subject to a payment premium applied to their dynamic price adjuster. This payment premium is calculated as a dollar amount per foot of a wrap and added to the dynamic price calculation in the pricing module 105. The system may also determine the price adjuster based on customer reviews/ratings for a service provider. The service provider having better average customer reviews/ratings may be subject to a higher price adjuster.

In some embodiments, the system may calculate and store the price adjuster specific to each service provider in the service provider database 101a, so that it can be readily applied to any appropriate project.

Key Shop Factors

To carry out wrap design projects in the most efficient fashion possible, it is vitally important to optimize material usage and minimize waste. In addition, different equipment types introduce additional time requirements to complete a project. The system 100 utilizes shop-provided data, including the types and models of wrap printers, types and availability of wraps materials, maximum printable width accepted for printing, laminating, and cutting, in order to determine a variety of items within the fulfillment module 107. The shop-provided data may also include the printer ink system utilized by the service provider to build in required production time minimums. The system 100 will determine if the service provider can meet the color requirements of a wrap design project based on the information about the printing system. In addition, system 100 may optimize the color file and the production file to ensure color consistency while utilizing the information about the service provider's equipment.

Customer Information

Customer information may include the characteristics, condition, and location of the installation target (e.g., vehicles, appliances, architectural objects), which is important for the system 100 to select an appropriate service provider and determine by the pricing module 105 real-time price information for a wrap design project.

Installation Target

One of the most important factors in calculating the price for and ultimately fulfilling a wrap design project is the size and complexity of the installation target.

Initially, to complete a successful installation of an installation target, a template must be identified. A template is a scaled dimensionally accurate digital representation of all desired profiles of an installation target. Utilizing this template, a user may place design elements digitally. The design elements are produced and placed both at the scaled correct size and also at the same location on the installation target. By providing key installation target information, the system will determine if it contains an appropriate template. If the installation target is a vehicle, the system may search by year, make, model, and trim or utilize a VIN level verification. If no match is found or if the installation target is architectural, the system will begin the template creation workflow.

The calculation of pricing information for a wrap design project occurs in the pricing module 105. For more accurate price determination and to ensure the highest quality end product possible, the system 100 needs to identify as much pertinent information regarding the installation target as possible. For example, if the installation target is a light-duty commercially available truck, the system 100 needs to identify the information related to the truck, including its year, make, model, trim, cab type, and bed length. Such information contributes to the project size, complexity, and coverable area. In one example, the key information about a vehicle can be obtained and/or verified by utilizing tools, such as a VIN number decoder.

If the installation target is an architectural object, the system 100 will need to obtain the dimensional (e.g., two-dimensional, three-dimensional) information of the architectural object, including adhesive properties and geometric complexities. Other information about architectural object includes natures of coverable surface, e.g., material types (e.g., wood, glass, brick) of coverable surface, exterior or interior of a building, roof, door, window, etc. The system may also make a material determination based upon factors such as customer requirements for durability, lifespan, and ease of product removal.

Condition of Installation Target

Depending on the condition of the installation target, the system 100 will either allow the customer to proceed or require a manual audit of the installation target prior to closing a transaction. For example, vinyl materials are intended to be installed on surfaces with sufficient adhesive properties, e.g., in a "like new" condition. In addition, vinyl cannot be applied on top of the existing vinyl. As such, the system must determine if existing vinyl needs to be removed prior to wrap installation. In addition, if the installation target has any OEMs or aftermarket accessories installed that may prohibit a proper installation, they must be removed and reinstalled to allow for proper installation.

If a pre-installation removal of existing materials or accessories is required, the system 100 may determine if such pre-installation removal can be performed by a service provider in the database and, if so, calculate a cost of the removal and add the cost to the real-time price calculation for the wrap design project.

Installation Target Audit

It is vitally important for a successful installation and lifespan of a wrap to understand the condition of the installation target. Based upon many factors, areas of an installation target may need to be avoided as not suitable for an installation, or specialized materials may need to be used on others. In other cases, special considerations need to be applied to account for obstructions such as existing wrap materials or accessories that could block access to the core installation target. Utilizing images of the installation target captured by the user, the specific condition of the target can be extrapolated. For a vehicle, areas such as wheels, tires, plastic trim, and windows are identified and may be classified as not suitable for coverage. Windows are further categorized as acceptable for coverage or not based upon local laws. For example, the front windshield and front driver and passenger windows are typically illegal to cover, but rear windows can be in either a specialized perforated semi-transparent material or a solid film. Additionally, if the installation target is a vehicle, the condition of each specific example of a certain year, make, model, trim has the potential for infinite variability. Dents, scratches, paint chips, rust, or other damage must be considered in completing a successful project. By comparing customer captured images of the installation target with images of a similar example or by utilizing computer vision to identify these possibilities, the system gains an understanding of condition. For architectural installation targets, a similar comparison must be made. For this installation type, a much more broad portfolio of potential materials is available. By understanding the composition of the installation target and key data points specific to the performance expectations of the wrap material, the most appropriate mix of materials is selected.

Installation Target Location

System 100 also takes into account the location information of the installation target to assist in the service provider selection process and to determine the pricing information of the wrap design project. If the installation target is a vehicle, the customer will need to specify whether he/she will drive the vehicle to the service provider for installation. In this scenario, the pricing module 105 will not apply the cost for the service provider to travel to the location of the installation target. On the other hand, if the customer indicates that on-site installation is needed, e.g., for architectural objects, system 100 will select a service provider who opts in for on-site installation and meets a distance limit. Upon selecting a service provider, the pricing module 105 will calculate the cost for the service provider to travel to the location of the installation target and add the cost to the final price in order to compensate the service provider for the additional effort required to complete the project.

b. Design Module

The existing methods for custom vinyl products generally lack the ability to allow customers to meaningfully contribute to or participate in the design phase. Historically, specially trained individuals with specialty equipment and software were required to create a production-ready design. For a design to be truly production-ready, a scaled template for the installation target is required, design elements need to be checked for quality, elements need to be placed in a way that accounts for complex shapes within the installation target, elements must only be placed on acceptable areas of the installation target, and common industry treatments must be applied to the design for a successful installation. Unlike the existing methods, the system, as disclosed, provides customers all the tools/modules in an intuitive fashion to enable them to create their customized production-ready designs.

Template Module

A high-fidelity virtual template (e.g., dimensionally accurate digital representation) is required to accurately estimate where specific portions of a virtual design will land on a physical surface. Without the ability to guaranty that the physical placement of design elements on the installation target will match the virtual representation that the customer is designing on, a high-quality wrap design cannot be expected. This requirement becomes significantly more challenging to meet when the physical installation target comprises many geometrically complex curves, areas with different adhesive properties, and different legal requirements regulating coverage.

Based upon the complexity of the installation target and the capabilities of a user's mobile device, a user will be presented with one of two possible workflows. For simply shaped targets, a user may measure by hand and directly input exact dimensions. By capturing a photo of all applicable profiles of an installation target and overlaying measurements, the system will create a template. However, if the installation target is complex and the user has an adequately provisioned mobile device, a more detailed template will be created. Utilizing a sensor(s), such as a LiDAR sensor, a camera, a gyroscope, GPS, accelerometer, barometer, or a combination thereof, the mobile device will capture a plurality of point measurements for each applicable profile of the installation target. The LiDAR sensor specifically will project a plurality of pulsed light waves towards the installation target, and by calculating the time of flight of these light waves traveling from the device to the installation target and back to the device, a three dimensional understanding of the installation target can be extrapolated. By overlaying this data with photos of the target, elevations calculated from a barometer, and movement captured from an accelerometer and GPS, a full understanding of the installation target at a one-hundred percent scale is gained. The full-scale profiles can then be scaled down, for example, to $\frac{1}{10}$ scale, for ease of use in later modules.

Due to the complex and infinitely variable nature of these complex shapes, it is vital to have a scaled dimensionally accurate digital representation of these shapes. Utilizing key installation target data logged by a customer within the customer database 101b, the system 100 identifies or, if possible, creates the correct template de novo. For example, the system 100 searches the template database for an exact digital template match the customer's project. By way of example, if the installation target is a vehicle, system 100 may use the key variables, such as the year, make, model, trim, and size of the vehicle to identify the correct template. On the other hand, if the system does not have a template readily available for the installation target, the system will create one for that specific installation target.

For projects with limited shape complexity, such as a wall covering, the customer may input exact dimensions of the height and width of the wall. However, in some scenarios where the installation target is complex (e.g., with irregular shapes, curved surfaces) or the user does not have the ability to measure, or otherwise, no existing template is available, the system 100 may utilize a customer device, such as a tablet or a smartphone, to conduct these measurements.

Figure 3:
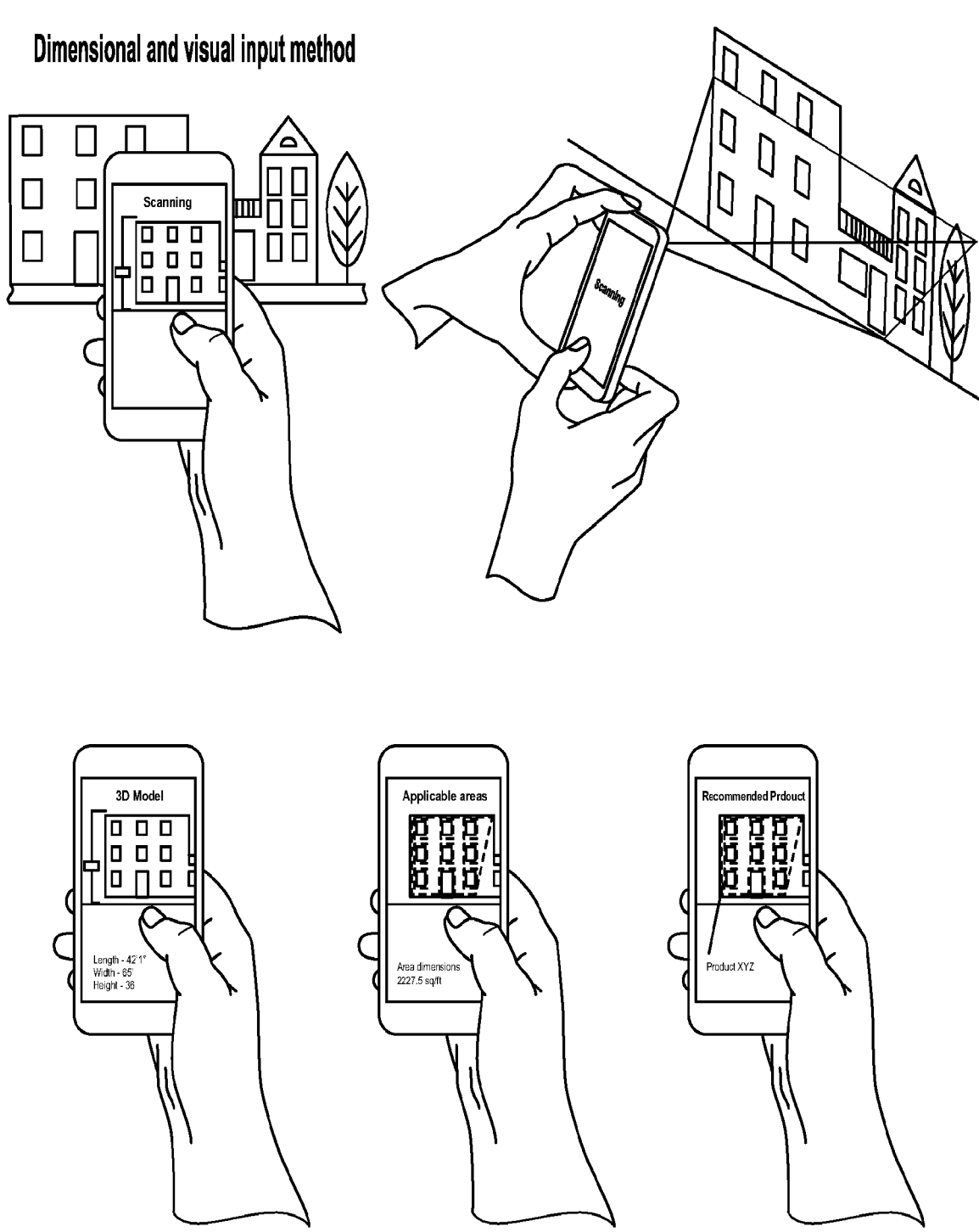
FIG. 3 is a set of diagrams showing a process to acquire project information (e.g., dimensional information) of an architectural object.
Figure 4:
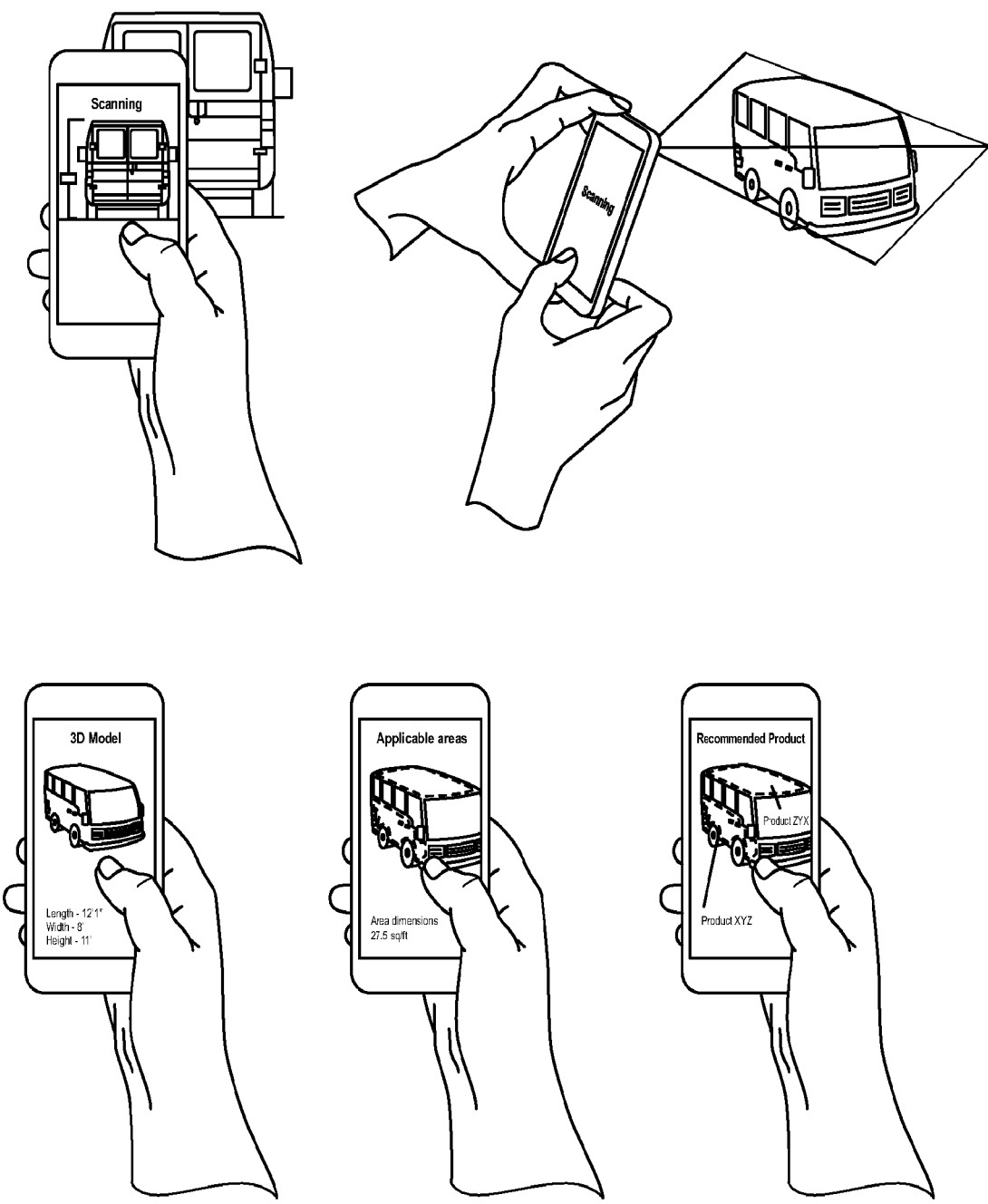
FIG. 4 is a set of diagrams showing a process to acquire project information (e.g., dimensional information) of a vehicle.

Recently, with advances in sensor technology, such as in cameras and LiDAR, along with advancements in processing power and network speed, consumer devices have become exponentially more capable. For example, utilizing the built-in camera, GPS, gyroscope, accelerometer, barometer, and/or LiDAR sensor of customer devices, the dimensional information of the installation target can be determined, e.g., based on the time of flight or the time it takes the light to travel from a device sensor to a point on the installation target and travel back to the sensor (see FIGS. 3 and 4). The system will carry out several of these point measurements to create a scaled virtual three dimensional and dimensionally accurate representation of each applicable side of the installation target. If needed, the system will instruct the customer a path to capture up to 360 degrees around applicable surfaces of the installation target so that the system can construct a full 3-dimensional model of the installation target.

3D Modeling Whether a template has been created or identified within a database, a three-dimensional scaled digital representation of the installation target may be created to aid in later modules. By overlaying scaled profile views of the installation target with customer captured photos of the same, the model is created.

File Upload Module

In some scenarios, customers may wish to include one or more design elements, such as an asset (e.g., logo, trademark, company name, contact information, URL, slogan), within the wrap design. A challenging aspect of large format printing is ensuring sufficiently high resolution of design elements, as they are scaled to span across significant portions of large installation targets. In that respect, the system will verify that customer-provided assets are of an appropriate file type and an adequate resolution.

Asset Placement Module

The system also provides customers the ability to add one or more design elements, such as assets, onto their wrap designs, and translates the placement of assets spanning across many body shapes and sides of a vehicle (see FIG. 6).

If the design elements are available in the customer database 101a, the system may obtain the design elements by querying the database. The design elements can also be provided by the customer, for example, through the file upload module. If needed, the customer can also specify the color, size, or shadowing effects of the design elements to be added to the wrap design.

The system may provide an interactive GUI to allow customers to carry out certain operations to customize the wrap design. For example, the system may allow customers to drop a design element on a particular area of the wrap design template and, for example, scale, rotate, drag side to side or up and down the design element. Also, the system also enables the customer to mirror design element placement from one side of an installation target to the other.

In addition, the system recognizes surfaces with a variety of adhesive properties as well as legal requirements dictating available materials and design options. For example, templates may dynamically notate installation target surfaces for available materials and installation options. In one example, the system may identify an excluded surface area (e.g., vehicle tire) on the installation target that is not suitable for wrap coverage. In another example, the system dynamically selects perforated film (e.g., transparent or one-way window film) to cover an area designated as a permissible window. Lastly, the system also identifies areas that are above and beneath the normal water line. In some embodiments, the areas beneath the normal waterline may be classified as an excluded surface area that is not suitable for wrap coverage.

c. Pricing Module

The system may also include a pricing module so that a price can be provided to customers in real-time in response to customers' design choices that they were making. Historically, to create a production-ready design for customers, a highly trained individual needed to create the design using specialized software. After a production-ready design is completed, a variety of steps must be carried out to transform that design into a format that can be easily printed and installed. The disclosed system gives consumers the ability and tools to create production-ready designs on their own while receiving a dynamic price quote based on every design choice they make.

The pricing module determines a price in real-time for a customer based on a number of variables (e.g., consumer information, service provider information). In addition, the customer has the ability to continually revise their design, and the pricing module dynamically updates the pricing information based on customer inputs.

Grid Segments

Figure 5:
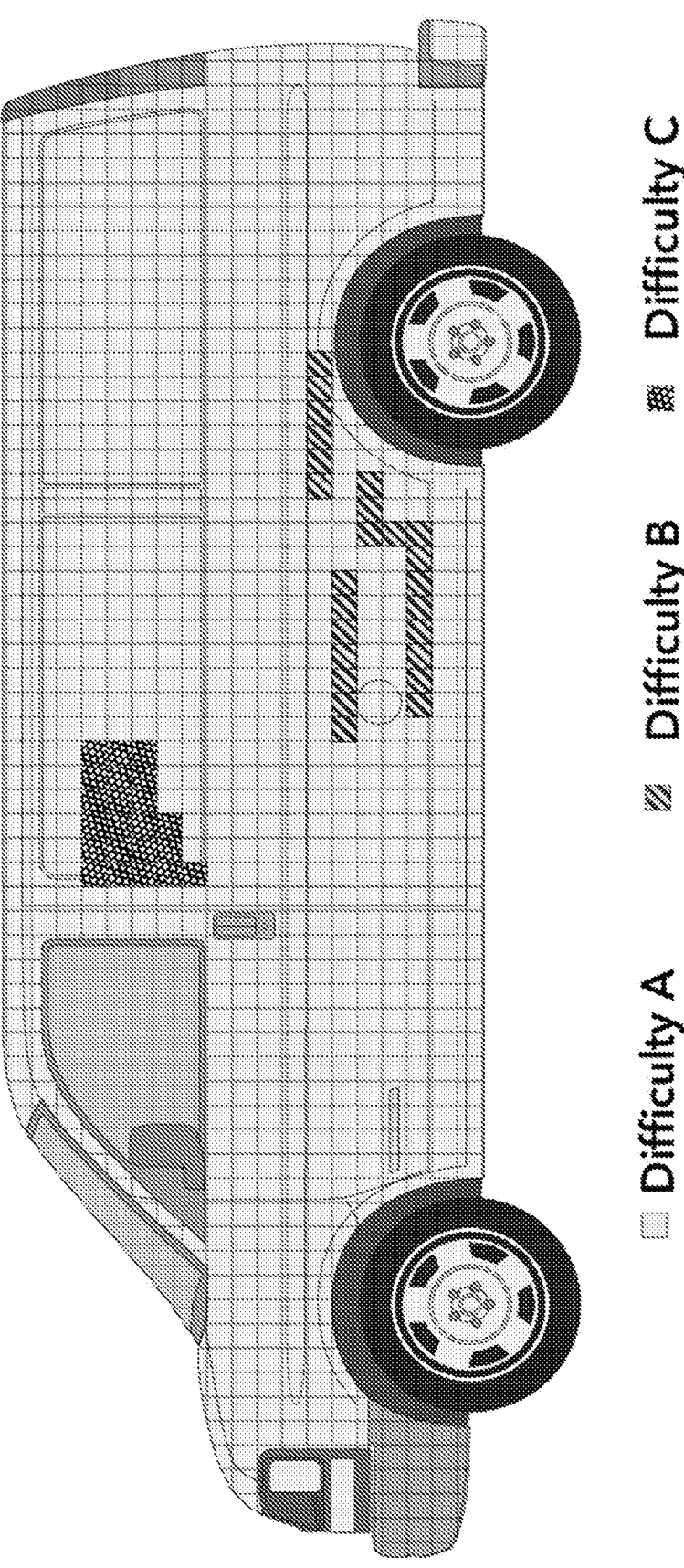
FIG. 5 is a diagram showing a scaled grid system for determining price information for a wrap design project.
Figure 7:
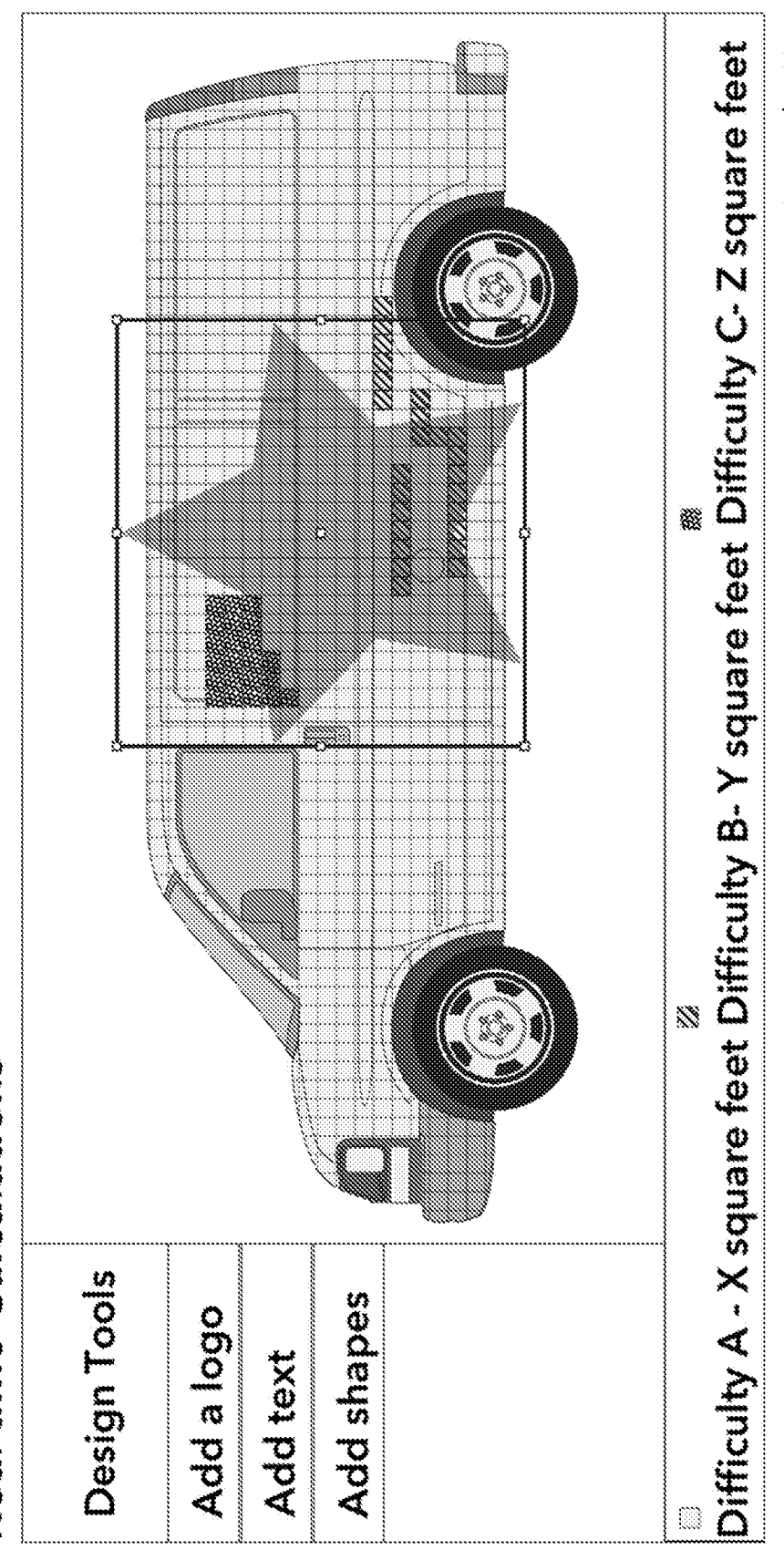
FIG. 7 is a set of diagrams showing a GUI for customized wrap design and real-time calculation of pricing information based on the grid system.

The complexity (e.g., irregular shapes, curved surface, etc.) of the physical surface of an installation target has a significant impact on the costs to create and install a wrap. To more accurately determine the pricing information of a wrap design project by taking into account the complexity of the physical surface, the system utilizes a grid segmentation method (see FIGS. 5-7). For example, each wrap template comprises a uniformly sized grid layer applied beneath design layers. Within the grid layer, uniformly sized grid segments are aligned by both X and Y axis. The grid segment size can be, for example, one-sixteenth of a square foot in size. The system determines, on a grid segment by grid segment basis, whether design elements are present within the grid envelope or not. Every grid segment has a difficulty rating associated with it, and each difficulty rating has a cost per segment to complete production and installation. Grid difficulty ratings are derived by the relative effort and time required to complete installation on any area compared to the difficulty of installation on a surface totally void of any curves or other complexities. The system categorizes all utilized grid segments by difficulty and determines the exact design square footage per section and multiples that number by the cost per foot associated with that difficulty rating and adds that to the cost per foot associated with the selected materials and the total calculated utilization of each specific material. All computed costs per difficulty ratings are then summed to determine the dynamic baseline cost to complete a project.

Price Adjusters

The ability to provide real-time pricing to a consumer in this industry is truly novel. In order for a real-time price to be calculated, many factors need to be considered, including grid segments, cost of living, materials, raw material requirement calculations, additional labor requirements, and the need to remove existing graphics are all inputs to calculating a real-time price. For example, the real-time price is calculated based on factors including a cost of living index that covers many geographic areas throughout the country. The cost of the project is adjusted by a percent increase based on a comparison between customer-provided geographic information and a system-provided baseline. The baseline can be set by referring to a geographic area with the lowest cost of living.

The production of wrap materials may contain a number of different materials. The four primary components of a complete wrap material mix are the adhesive layer, film layer, ink, and a protective over a laminate layer. Based upon customer requirements such as attributes of their installation target, expectations of material lifespan and ease of removability, resolution, and quality of printed elements, desired transparency, and desired finish (e.g., reflective, glossy, metallic, luster, matte, etc.), appropriate materials need to be selected. In some cases, many different combinations of materials will be required to complete the full scope. Each set of materials represents a different cost that needs to be applied to the square footage requirement for that material mix and added to the overall project cost. The raw material requirement for a given project is required to price a project. Due to limitations in manufacturing equipment and the geometry of user-created design elements, a yield of one hundred percent of raw materials is unlikely. However, to provide value to customers and increase company profits, it is advantageous to place elements for production in a way that maximizes yield as much as possible. Based on a customer design, additional production measures may be necessary. For example, if a design calls for a small element to be produced, the materials may need to be run through a plotting machine to be cut out. Plotting machines require a margin on either side of the customer printed design for specialized production markings to be placed. These markings are utilized to ensure proper cutting. Due to the additional margin elements requiring cutting will have a lower yield than those that do not. For example, the maximum production width of a sheet is known based on required production steps and known service provider limitations.

The unknown variable is the length of raw material required to produce the customer design. It is advantageous to complete the project by arranging all discrete elements of the design in a way that minimizes the required length of raw material. Some elements require significantly more labor to ensure proper installation. Whether that labor is hand cutting materials or weeding out cut but wasted materials, additional labor requirements must be calculated and considered to create an appropriate price. Wrap materials need to be placed over the raw installation target and not over existing wrap materials. The additional labor time required to remove existing materials must be calculated to provide a quote. Finally, if items are blocking areas of the installation target, the additional labor cost to remove and reinstall them needs to be calculated and included in a quote.

After a dynamic baseline price is calculated, the system applies other price adjusters to create a verified price quote for a particular wrap design project. These price adjusters include variables, such as requirements to remove existing graphics or accessories, customer timeline requirements, service provider accolades, tax, and service provider cost of living. For architectural projects, additional adjusters are applied, such as travel time, costs associated with acquiring specialized equipment, and insurance costs. After identifying and applying all applicable price adjusters, the system calculates a final price quote for a customer project based on its current design.

Print Layout

Historically special trained individuals were required to carry out the manual creation of production files that are the foundation of the physical installation. Production files are the individual elements produced to complete a project. In order to ensure a high-quality installation, many variables are considered. Based on key service provided data such as production limitations, the appropriate material width is selected. Next, for design elements requiring cutting by a plotter, the maximum print width is reduced, and additional printed elements for production need to be overlaid. For large-scale projects, many sheets of real materials are installed with one another. These sheets can be produced either parallel or perpendicular to the ground. Based upon the overall height and width of the applicable area of an installation target, the appropriate orientation is determined. Once the orientation is determined, repetitive areas of panels or overlap must be included in the production files. This overlap is utilized to ensure complete coverage of the target as well as a complete continuation of a design element from one panel to another. For all panels at the edge of the installation envelope, additional bleed must be added to ensure complete coverage. Finally, for elements requiring precise placement over design elements, the system may choose to produce them separately from the background element, ensuring that they can be installed exactly in the intended area.

d. Fulfillment Module

The system may further include a fulfillment module to transform a customer's digital design concept into a printed and installed graphic on the installation target. Within the fulfillment module, the complete customer design is translated into a plurality of files representing all unique elements required to achieve the customer design. Each file or panel is scaled to size and includes system-generated bleeds or material overages to ensure a cohesive completed design. The result of this is for ease in production and installation while also minimizing material waste and the best possible quality of the final product.

Color Verification

One of the most important aspects of completing a successful project is ensuring that printed materials are completed using the colors that the customer has specified. Whether they would like a design element to match the color of an aspect of their logo or perhaps a favorite color, the system needs to be able to specify the proper color to be printed. Many methodologies can be used to verify colors, for example, Pantone coding, or RGB, HEX, CMYK, or PMS values. The system can verify the exact color desired by the customer and encode it within design elements so that the end printer can recognize and produce them.

Design Element Layout

It is important to organize production elements such that wasted materials are limited to the furthest extent possible. The size and shape of these elements are determined by the installation target, the design, and the size limitations of the desired material. The system needs to translate these variables into a feasible and efficient print layout. It is advantageous to maximize the utilization of raw materials to reduce waste and maximize profit. As shown in FIG. 8, the system places and arranges production elements in a plurality of ways, while ensuring that they are within the bounds of the materials until the layout or placement of individual elements with the least waste is identified. This layout is then transmitted to the selected service provider for production.

Specifically, the system sets a maximum sheet width limit based on the printing and cutting limits of the selected service provider. After a maximum width is set, the system places elements in a plurality of locations and orientations across all available widths of selected materials less than maximum service provider capabilities to determine the most advantageous mix to reduce material waste. The maximum available width determined above is the width of the asset panels created by the system. The system applies additional treatments to the design elements such as adding a sufficient amount of bleed or extra materials on each of the sides of elements to ensure enough material is present to cover the installation target, to hide the edges of the vinyl material, and to create a more appealing and durable final product. Another example of treatment the system might apply to a customer wrap design is to overlay cut lines to be used by service provider hardware to cut out smaller graphics while only leaving behind minimized waste and ensuring the highest quality cuts to the material.

Wrap Materials

The material types available to the system range in size, finish, transparency, conformability, capabilities, and suitableness for specific installation targets. Material lifespan ranges from temporary to indefinite. Installation targets range from architectural to transportation. The basic components of the film are an adhesive layer, a film layer that comes with a particular finish or reflective capabilities and in some cases is printable, and a laminate layer that both protects the film layer from environmental elements, such as sun or rain, protects the film from friction from other objects and adds a level or sheen. In some embodiments, the film material is a plastic material, e.g., thermoplastic material, thermosetting plastic material.

In some embodiments, the film material can be selected from the group consisting of acrylics, polyamide-imide (PAI), polyetherimide (PEI), polyimide (PI) (e.g., thermoplastic polyimide), aromatic thermoplastic polyester (e.g., polyacrylate), polycarbonate (PC), Polybutadiene (PBD), polydimethylsiloxane (PDMS), polyaryletherketone (PAEK), polyethylene naphthalene dicarboxylate (PEN), polysulphone (PSU, polyphenylene sulfide (PPS)), polyethylene (PE), polyglycolic acid (PGA), polylactic acid (PLA), polylactic-glycolic acid copolymer (PLGA), polyoxymethylene plastic (POM/Acetal), polyphenylene ether (PPE or PPO), polypropylene (PP), polystyrene (PS), polytetrafluoroethylene (PTFE/TEFLON), polyvinylchloride (PVC), polyvinylidene fluoride (PVDF), thermoplastic elastomer (TPE), liquid crystal polymer, natural or synthetic rubber, polyamide (PA), and the mixtures of two or more thereof.

In some embodiments, acrylics may include polymethylmethacrylate (PMMA), acrylonitrile (e.g., acrylonitrile butadiene styrene (ABS) copolymer, polyacrylonitrile (PAN)). Polyaryletherketone (PAEK) may include polyetheretherketone (PEEK) and polyetherketone (PEK). Polysulphone (PSU) may include aromatic polysulfone, polyethersulfone (PES), and poly(arylene sulfone) (PAS). Polyethylene (PE) may include polyethylene terephthalate (PET or PETE), low-density polyethylene (LDPE), high-density polyethylene (HDPE), and ultra-high-molecular-weight polyethylene (UHMWPE)). Polyamide (PA) may include aliphatic polyamide, aromatic polyamide, semi-aromatic polyamide. Polyamide (PA) may also include nylons, such as polyamide-11 (nylon-11), polyamide-12 (nylon-12), polyamide-4,6, polyamide-6 (nylon-6), polyamide-6,10, polyamide-6,12, polyamide-6,6 (nylon-6,6), polyamide-6,9.

Installation Proof

After all elements are sheeted out to minimize material waste, an installation proof is required to be created to serve as the instruction manual for applicable service providers to complete installation of a wrap design project according to customers' specifications (FIG. 9). For example, each individual asset is numbered on both the installation proof and within the bleed of the asset itself so the service provider can ensure that any specific asset is placed at the exact location specified by the installation proof.

Distribution to a Selected Service Provider

Finally, the system will package all assets in a form that can be transmitted to the selected service provider for fulfillment. Also, based on service provider equipment limitations, such as ink drying times logged within the service provider database, the system can calculate a minimum production time of the wrap design project. In the meantime, the system will allow the customer to schedule a time with the selected service provider for installation of the wrap. In some embodiments, the system may also integrate the calendar information of a selected service provider so that the customer can schedule the installation directly through the system.

e. Service Provider Workflow

To participate in the system, a service provider will need to first submit an application. The application may include service provider information, such as location, capability, accolades, maximum printable width, or a combination thereof. After the application is reviewed and accepted by the system, the service provider is admitted to the network. After acceptance, they are granted access to create an account in the system. This account allows them to provide all of the required shop information to appear in the pricing module. Examples of this information include their location, accolades, and capabilities. The service provider information can be stored in the service provider database.

When a customer is matched with a particular service provider, the service provider will be presented with all pertinent project details, including the completed customer design, e.g., through installation proof. The service provider may then either integrate their calendar with the system so the project can be scheduled in real-time or manually provide installation scheduling options for the customer. After timing is locked in, the system initiates a down payment (e.g., 50% of the project cost) to the service provider. After the project is completed, the service provider uploads photos of the installation target with the newly installed wrap for review. Once the project is cleared in the system, the customer is notified of project completion and the service provider is paid the remaining balance due to them.

f. Customer Workflow

A customer may interact with the system by initiating a design flow via the website or mobile application. Upon entering the system, the user provides project information, such as details on the installation target, the location, and the timeline. The system will query the installation target in the database and determine if a template option is available. Based on the results of this query, the system will follow one of three paths:

Path 1—Template Available

If the result of the customer query is a trim level template match, the system passes it to the user. A viable method to verify match for a vehicle type installation target would be a VIN query against a VIN decoder to extract all relevant vehicle information. The system will then match the specific vehicle with an identical template.

Path 2—Requirement for Manual Entry of Installation Target Dimensions

If the result of the query is that no matching template is available and the installation target is a simple shape (e.g., a two-dimensional layout), the user is able to provide a series of system directed measurements and photos such that a template can be created for that specific installation target.

Path 3—User Device Computation of Dimensions

If the result of the query is that no matching template is available and the installation target is a complex shape and the user is equipped with an appropriately equipped mobile device (e.g., tablet, smartphone), the system creates a scaled three-dimensional digital representation of the installation target based on measurements made by one or more sensors (e.g., camera, LiDAR sensor, gyroscope, GPS, accelerometer, and barometer) equipped with the mobile device. In some embodiments, the system will instruct the user to physically maneuver around the target, such that the device captures not only the side to side but the vertical angles of the target. Once the system has gathered enough information to create the model, the customer is informed and presented with the completed template. The template is then broken down into profile views for the customer to design on.

Following the establishment of a sufficient template match to the installation target, the customer initiates the design phase. The customer may wish to work with a company representative to create a design or he/she may wish to create a design by himself/herself. If a customer elects to create his/her own wrap design, the system will present the customer with a blank digital representation of the installation target. To transform the digital representation into a completed wrap design, the system provides the customer with tools to create shapes, text, and images. With the tools, the customer is able to layer in a variety of colors to each element he/she places. The customer may also replicate design elements from one side to another to create a cohesive design. As the customer's wrap design evolves, the price quote for the wrap design fluctuates, allowing the customer to understand the implications of his/her design choices on pricing. Based on the pricing information, the customer may alter the wrap design as needed, and the system will, in turn, dynamically update/modify the pricing information based on the alteration the customer makes to the wrap design. Upon the completion of their design, the customer is provided with a path to transact on the exact design.

To fulfill installation of the wrap design, the system allows the customer to schedule in real-time with the selected service provider or within the bounds of the selected service provider timely reply. To finalize the scheduling of a project, the system may require the customer to pay a deposit (e.g., 50% of the cost of the project). The system will provide the customer with timely updates and/or information about the project until the installation begins. Upon completion of the installation, the system will notify the customer, for example, by sending a notification message to the customer device and prompts the customer to pay the remaining balance of the project cost.

B. Methods for Generating Wraps

In one aspect, this disclosure provides a method for generating a wrap for an installation target. With reference to FIG. 2, method 200 may begin with, at 201, obtaining from a customer via a customer device a request to initiate a wrap design and installation project. At 203, the method continues with receiving from the customer device project information comprising initial information on the installation target. At 205, the method includes generating through a design module a project wrap design for the installation target based on the project information. At 207, the method includes determining by a pricing module pricing information comprising a price quote for the wrap design and installation project based on the project information and service provider information, stored in a database, of one or more service providers capable of producing and installing the wrap for the installation target.

At 209, the method includes transmitting to the customer device the project wrap design and the pricing information comprising the price quote. At 211, the method further includes receiving a customer input from the customer device, comprising: confirmation of acceptance or rejection of the project wrap design or the price quote; or a request for modification of the project wrap design and optionally one or more elements to be added to the project wrap design.

At 213, if the customer input comprises the confirmation of acceptance, the method includes providing, by a project fulfillment module, the project wrap design to a service provider to fulfill the wrap design and installation project. Alternatively, at 213, if the customer input comprises the request for modification, the method includes modifying the project wrap design based on the request for modification and optionally the one or more elements; transmitting to the customer device the modified project wrap design and adjusted pricing information comprising an adjusted price quote; and repeating the step of 211.

In some embodiments, the method further includes, at 205, determining whether a scaled accurate dimensional representation for the installation target is available in a database; and if the scaled accurate dimensional representation is available, generating the project wrap design based on the scaled accurate dimensional representation; or if the scaled accurate dimensional representation is unavailable, acquiring additional information of the installation target from the customer device and generating the project wrap design based on the additional information.

In some embodiments, the additional information of the installation target comprises a customer input comprising dimensions of the installation target. In some embodiments, the additional information of the installation target comprises a measurement of dimensions of the installation target by a sensor on the customer device. In some embodiments, the sensor comprises a LiDAR sensor, a camera, a gyroscope or a combination thereof.

In some embodiments, the method further includes, at 205, constructing a three-dimensional model of the installation target based on the measurement by the sensor. In some embodiments, the method further includes, at 205, receiving and executing a customer operation on the project wrap design. In some embodiments, the customer operation comprises adding, scaling, rotating, cropping, dragging, or mirroring a design element or assigning a color for one or more portions of the project wrap design.

In some embodiments, the design element comprises a logo, a company name, contact information, a URL, a trademark, a slogan, or a combination thereof. In some embodiments, the design element is provided by an asset placement module.

In some embodiments, the method further includes, at 211, receiving one or more elements through a file upload module or through a query of a library.

In some embodiments, the method further includes, at 205, generating the project wrap design that accounts for an excluded surface area on the installation target. In some embodiments, the excluded surface area is excluded from coverage of the wrap based on a legal requirement or is not suitable for coverage by a wrap. In some embodiments, the excluded surface area comprises a physical surface of a window, a tire, an area near or below the waterline. In some embodiments, the method further comprises choosing a desired wrap material based on the physical surface of the installation target and customer requirements on lifespan and durability.

In some embodiments, the method further comprises generating a print layout for the project wrap design based on design or size limitations of the desired wrap material or a printing device, thereby minimizing waste of the desired material and maximizing profit. In some embodiments, the method further comprises verifying a color of the project wrap design to ensure that the color is consistent with the color assigned by the customer, optionally based on Pantone coding or CMYK values. In some embodiments, the desired material comprises a plastic material.

In some embodiments, the method further comprises selecting the service provider based on accolades, a schedule of the service provider, or both. In some embodiments, the service provider information comprises location, capability, accolades, maximum printable width (or raw material production width), or a combination thereof.

In some embodiments, the installation target comprises a vehicle, an appliance, or an architectural object. In some embodiments, the vehicle comprises a passenger vehicle, a recreational vehicle, or a commercial vehicle and wherein the architectural object comprises a window, a wall, a floor, a building, an exterior or an interior.

In some embodiments, the method further includes, at 207, determining the pricing information by the pricing module based on the project information comprising complexity of the project wrap design, timeline requirement, size, location, desired material, condition or a combination thereof. In some embodiments, the method further includes, at 207, determining the pricing information based on a sum of installation costs of all grid segments constituting the project wrap design, wherein the project wrap design is segmented into one or more grid segments, wherein each of the one or more grid segment is assigned with a difficulty rating, and wherein the installation cost of each of the one or more segments is determined based on the difficulty rating thereof.

In some embodiments, the project information comprises year, make, model, trim, cab type, bed length, vehicle identification number, condition, or a combination thereof of the vehicle, or one or more surface types of the architectural object. The one or more surface types are selected from brick, glass, woods, flat, curved, and transparent. In some embodiments, the condition of the vehicle comprises existing surface condition, the presence of an OEM or aftermarket accessory, an existing surface attachment, or a combination thereof.

In some embodiments, the method further comprises: receiving an application from the service provider comprising the service provider information; reviewing the application and admitting the service provider; and storing the service provider information in the database. In some embodiments, the service provider information comprises a calendar of the service provider comprising a schedule of the service provider availability.

C. Network-Based Communication and Computing Architecture

Figure 10:
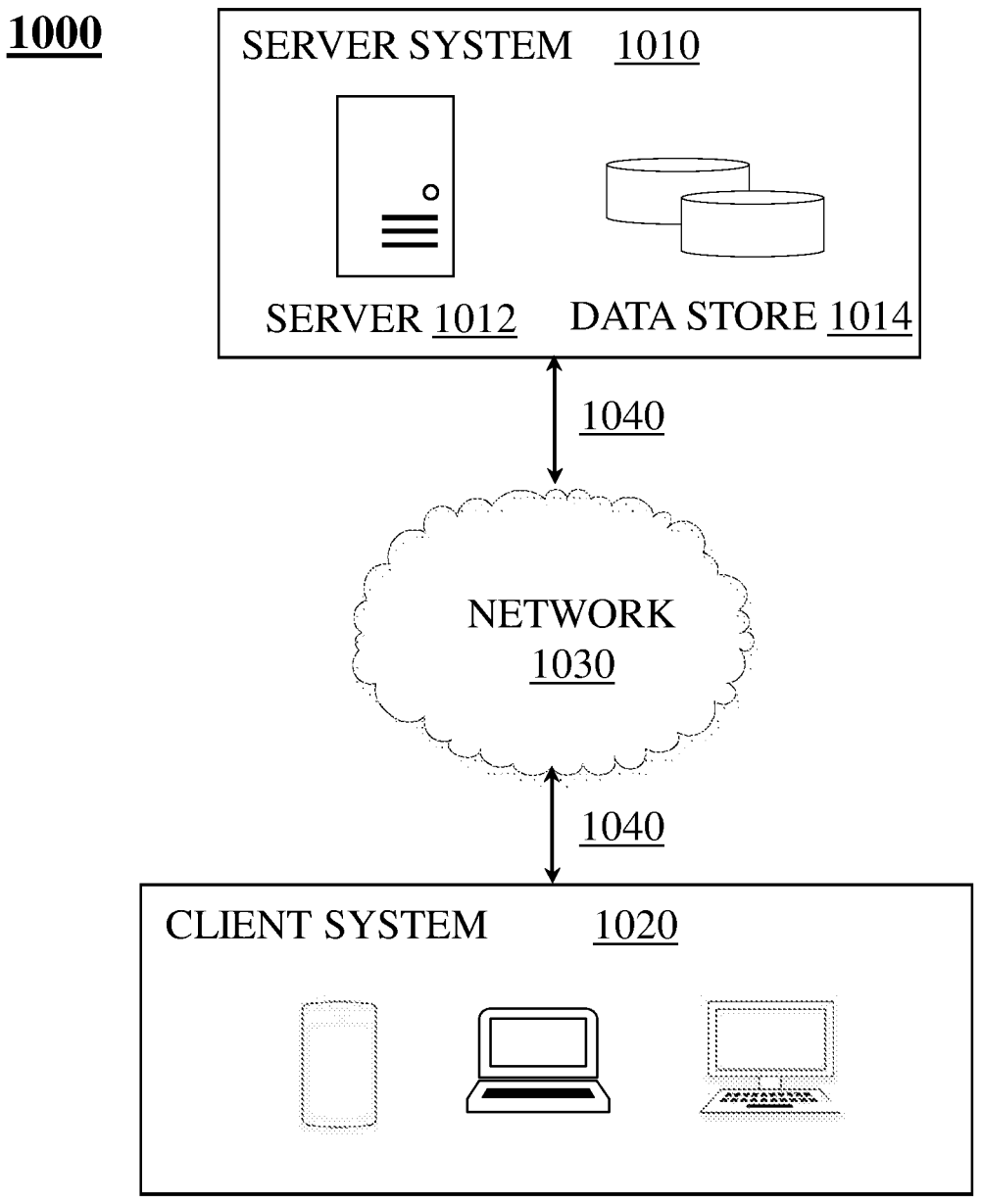
FIG. 10 is a diagram showing an example system for implementing the disclosed methods.

FIG. 10 illustrates an example of a system 1000 for implementing the disclosed methods. The system may include one or more internet-based server systems 1010 that are capable of communicating with one or more client systems 1020 via communication network 1030. Although FIG. 10 illustrates a particular arrangement of server systems 1010, client systems 1020, and network 1030, this disclosure contemplates any suitable arrangement of server systems, client systems, and network. As an example and not by way of limitation, one or more of server devices and one or more of client systems 1020 may be connected to each other directly, bypassing network 1030. As another example, two or more of client systems 1020 and one or more of server systems 1010 may be physically or logically co-located with each other in whole or in part. Moreover, although FIG. 10 illustrates a particular number of client systems 1020 and server systems 1010 and networks 1040, this disclosure contemplates any suitable number of client systems 1020 and server systems 1010 and networks 1030.

The server systems 1010 may be coupled to any suitable network 1030. As an example and not by way of limitation, one or more portions of network 1030 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1030 may include one or more networks 1030.

Links 1040 may connect client systems 1020 and server system 1010 to communication network 1030 or to each other. This disclosure contemplates any suitable links 1040. In particular embodiments, one or more links 1040 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1040 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1040, or a combination of two or more such links 1040. Links 1040 need not necessarily be the same throughout network environment 1030. One or more first links 1040 may differ in one or more respects from one or more second links 1040.

In some embodiments, the server system 1010 may generate, store, receive and send data, such as, for example, user profile data, concept-profile data, social-networking data, or other suitable data. Server system 1010 may be accessed by the other components of system 1000 either directly or via network 1030. In particular embodiments, server system 1010 may include one or more servers 1012. Each server 1012 may be a unitary server or a distributed server spanning multiple computers or multiple datacenters. Servers 1012 may be of various types, such as, for example, and without limitation, web server, news server, mail server, message server, advertising server, file server, application server, exchange server, database server, proxy server, another server suitable for performing functions or processes described herein, or any combination thereof. In particular embodiments, each server 1012 may include hardware, software, or embedded logic components or a combination of two or more such components for carrying out the appropriate functionalities implemented or supported by server 1012. In particular embodiments, server system 1010 may include one or more data stores 1014. Data stores 1014 may be used to store various types of information. In particular embodiments, the information stored in data stores 1014 may be organized according to specific data structures. In particular embodiments, each data store 1014 may be a relational, columnar, correlation, or other suitable databases. Although this disclosure describes or illustrates particular types of databases, this disclosure contemplates any suitable types of databases. Particular embodiments may provide interfaces that enable a server system 1010 and a client system 1020 to manage, retrieve, modify, add, or delete, the information stored in data store 1014.

In some embodiments, client system 1020 may be an electronic device including hardware, software, or embedded logic components or a combination of two or more such components and capable of carrying out the appropriate functionalities implemented or supported by client systems 1020. As an example, and not by way of limitation, a client system 1020 may include a computer system such as a desktop computer, notebook or laptop computer, netbook, a tablet computer, handheld electronic device, cellular telephone, smartphone, other suitable electronic device, or any suitable combination thereof. This disclosure contemplates any suitable client systems 1020. A client system 1020 may enable a network user at client system 1020 to access network 1030. A client system 1020 may enable its user to communicate with other users at other client systems 1020.

In some embodiments, client system 1020 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1020 may enter a Uniform Resource Locator (URL) or other address directing the web browser to a particular server (such as server 1012), and the web browser may generate a HyperText Transfer Protocol (HTTP) request and communicate the HTTP request to the server. The server may accept the HTTP request and communicate to client system 1020 one or more HyperText Markup Language (HTML) files responsive to the HTTP request. Client system 1020 may render a webpage based on the HTML files from the server for presentation to the user. This disclosure contemplates any suitable webpage files. As an example, and not by way of limitation, web pages may render from HTML files, Extensible HyperText Markup Language (XHTML) files, or Extensible Markup Language (XML) files, according to particular needs. Such pages may also execute scripts such as, for example, and without limitation, those written in JAVASCRIPT, VBSCRIPT, combinations of markup language and scripts such as AJAX (Asynchronous JAVASCRIPT and XML), and the like. Herein, a reference to a webpage encompasses one or more corresponding webpage files (which a browser may use to render the webpage) and vice versa, where appropriate.

Figure 11:
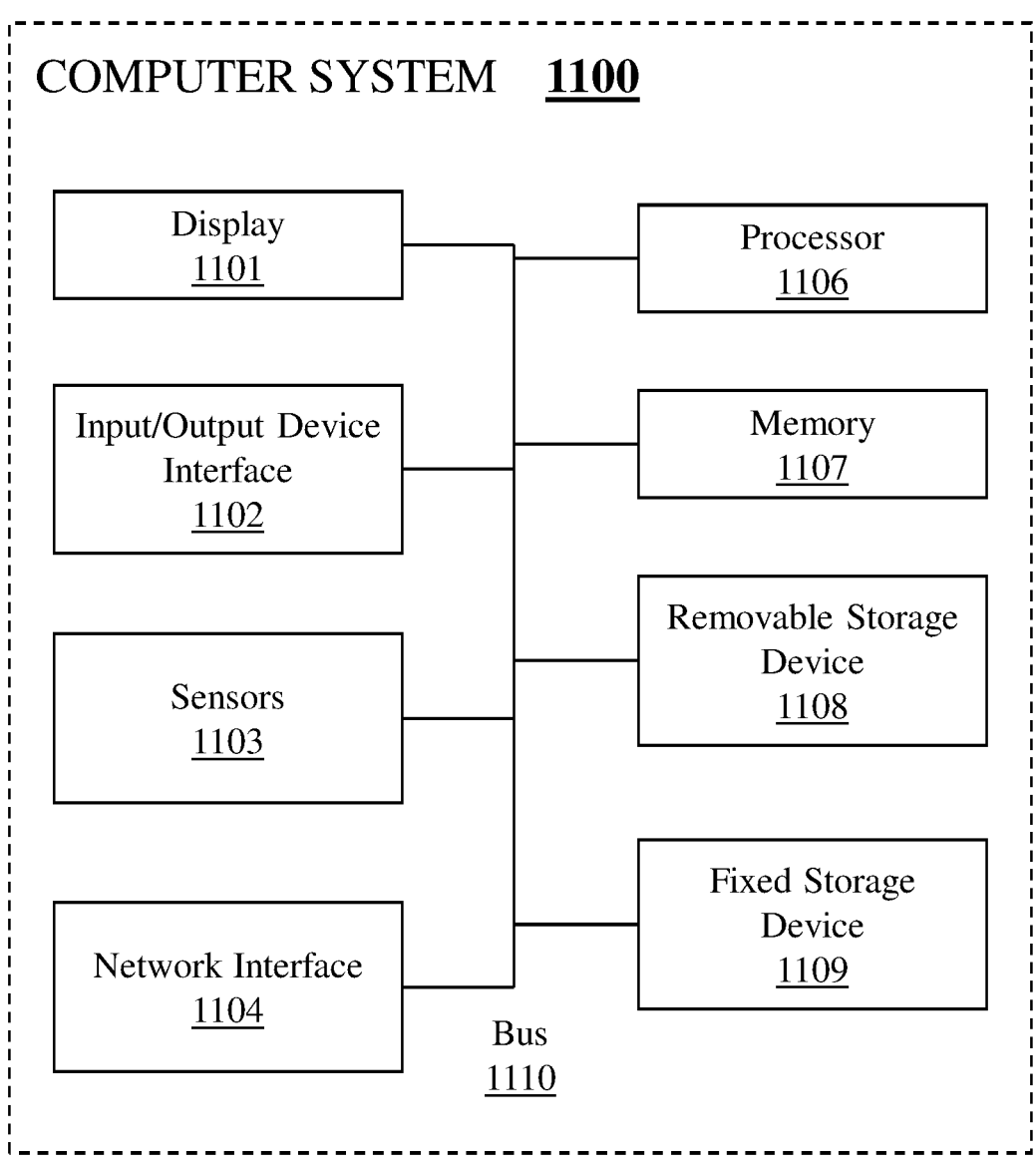
FIG. 11 is a diagram showing an example computing system for implementing the disclosed methods.

FIG. 11 is a functional diagram illustrating a programmed computer system in accordance with some embodiments. As will be apparent, other computer system architectures and configurations can be used to perform the described methods. Computer system 1100, which includes various subsystems as described below, includes at least one microprocessor subsystem (also referred to as a processor or a central processing unit (CPU) 1106). For example, processor 1106 can be implemented by a single-chip processor or by multiple processors. In some embodiments, processor 1106 is a general-purpose digital processor that controls the operation of the computer system 1100. In some embodiments, processor 1106 also includes one or more coprocessors or special-purpose processors (e.g., a graphics processor, a network processor, etc.). Using instructions retrieved from memory 1107, processor 1106 controls the reception and manipulation of input data received on an input device (e.g., image processing device 1103, I/O device interface 1102), and the output and display of data on output devices (e.g., display 1101).

Processor 1106 is coupled bi-directionally with memory 1107, which can include, for example, one or more random access memories (RAM) and/or one or more read-only memories (ROM). As is well known in the art, memory 1107 can be used as a general storage area, a temporary (e.g., scratchpad) memory, and/or a cache memory. Memory 1107 can also be used to store input data and processed data, as well as to store programming instructions and data, in the form of data objects and text objects, in addition to other data and instructions for processes operating on processor 1106. Also as is well known in the art, memory 1107 typically includes basic operating instructions, program code, data, and objects used by the processor 1106 to perform its functions (e.g., programmed instructions). For example, memory 1107 can include any suitable computer-readable storage media described below, depending on whether, for example, data access needs to be bi-directional or uni-directional. For example, processor 1106 can also directly and very rapidly retrieve and store frequently needed data in a cache memory included in memory 1107.

A removable mass storage device 1108 provides additional data storage capacity for the computer system 1100 and is optionally coupled either bi-directionally (read/write) or uni-directionally (read-only) to processor 1106. A fixed mass storage 1109 can also, for example, provide additional data storage capacity. For example, storage devices 1108 and/or 1109 can include computer-readable media such as magnetic tape, flash memory, PC-CARDS, portable mass storage devices such as hard drives (e.g., magnetic, optical, or solid-state drives), holographic storage devices, and other storage devices. Mass storages 1108 and/or 1109 generally store additional programming instructions, data, and the like that typically are not in active use by the processor 1106. It will be appreciated that the information retained within mass storages 1108 and 1109 can be incorporated, if needed, in standard fashion as part of memory 1107 (e.g., RAM) as virtual memory.

In addition to providing processor 1106 access to storage subsystems, bus 1110 can be used to provide access to other subsystems and devices as well. As shown, these can include a display 1101, a network interface 1104, an input/output (I/O) device interface 1102, a sensor(s) 1103, as well as other subsystems and devices. For example, I/O device interface 1102 can include a device interface for interacting with a touchscreen (e.g., a capacitive touch-sensitive screen that supports gesture interpretation), a microphone, a sound card, a speaker, a keyboard, a pointing device (e.g., a mouse, a stylus, a human finger), a global positioning system (GPS) receiver, a differential global positioning system (DGPS) receiver, an accelerometer, and/or any other appropriate device interface for interacting with system 1100. Multiple I/O device interfaces can be used in conjunction with computer system 1100. The I/O device interface can include general and customized interfaces that allow the processor 1106 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 1104 allows processor 1106 to be coupled to another computer, computer network, or telecommunications network using a network connection as shown. For example, through the network interface 1104, the processor 1106 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 1106 can be used to connect the computer system 1100 to an external network and transfer data according to standard protocols. For example, various process embodiments disclosed herein can be executed on processor 1106 or can be performed across a network such as the Internet, intranet networks, or local area networks, in conjunction with a remote processor that shares a portion of the processing. Additional mass storage devices (not shown) can also be connected to processor 1106 through network interface 1104.

In addition, various embodiments disclosed herein further relate to computer storage products with a computer-readable medium that includes program code for performing various computer-implemented operations. The computer-readable medium includes any data storage device that can store data which can thereafter be read by a computer system. Examples of computer-readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system, as shown in FIG. 11, is an example of a computer system suitable for use with the various embodiments disclosed herein. Other computer systems suitable for such use can include additional or fewer subsystems. In some computer systems, subsystems can share components (e.g., for touchscreen-based devices such as smartphones, tablets, etc., I/O device interface 1102 and display 1101 share the touch-sensitive screen component, which both detects user inputs and displays outputs to the user). In addition, bus 1110 is illustrative of any interconnection scheme serving to link the subsystems. Other computer architectures having different configurations of subsystems can also be utilized.

Other objects, features, and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

D. Definitions

To aid in understanding the detailed description of the compositions and methods according to the disclosure, a few express definitions are provided to facilitate an unambiguous disclosure of the various aspects of the disclosure. Unless otherwise defined, all technical and scientific terms used herein have the same meaning as commonly understood by one of ordinary skill in the art to which this disclosure belongs.

It is noted here that, as used in this specification and the appended claims, the singular forms "a," "an," and "the" include plural reference unless the context clearly dictates otherwise.

The terms "including," "comprising," "containing," or "having" and variations thereof are meant to encompass the items listed thereafter and equivalents thereof as well as additional subject matter unless otherwise noted.

The phrases "in one embodiment," "in various embodiments," "in some embodiments," and the like are used repeatedly. Such phrases do not necessarily refer to the same embodiment, but they may unless the context dictates otherwise.

The terms "and/or" or "/" means any one of the items, any combination of the items, or all of the items with which this term is associated.

The word "substantially" does not exclude "completely," e.g., a composition which is "substantially free" from Y may be completely free from Y. Where necessary, the word "substantially" may be omitted from the definition of the invention.

As used herein, the term "each," when used in reference to a collection of items, is intended to identify an individual item in the collection but does not necessarily refer to every item in the collection. Exceptions can occur if explicit disclosure or context clearly dictates otherwise.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All methods described herein are performed in any suitable order unless otherwise indicated herein or otherwise clearly contradicted by context. In regard to any of the methods provided, the steps of the method may occur simultaneously or sequentially. When the steps of the method occur sequentially, the steps may occur in any order, unless noted otherwise.

In cases in which a method comprises a combination of steps, each and every combination or sub-combination of the steps is encompassed within the scope of the disclosure, unless otherwise noted herein.

Each publication, patent application, patent, and other reference cited herein is incorporated by reference in its entirety to the extent that it is not inconsistent with the present disclosure. Publications disclosed herein are provided solely for their disclosure prior to the filing date of the present invention. Nothing herein is to be construed as an admission that the present invention is not entitled to antedate such publication by virtue of prior invention. Further, the dates of publication provided may be different from the actual publication dates, which may need to be independently confirmed.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for generating a wrap for an installation target, comprising:
   (a) obtaining from a customer, via a user interface generated on a display of a customer computing device, a request to initiate a wrap design and installation project, wherein the request comprises a project wrap design comprising at least one element and the user interface includes an initial price quote;

(b) receiving, via one of one or more computing devices, from the customer computing device project information comprising initial information of the installation target;

(c) receiving, via one of the one or more computing devices, one or more measurements of the installation target from at least one of: a camera or a sensor of the customer computing device;

(d) generating, via one of the one or more computing devices, a three-dimensional representation of the installation target, based on the one or more measurements, on the user interface, wherein the three-dimensional representation comprises a plurality of segments and the project wrap design imposed over the plurality of segments;

(e) determining, via one of the one or more computing devices, a difficulty score for each of the plurality of segments;

(f) receiving, via one of the one or more computing devices, an input to the three-dimensional representation modifying the project wrap design imposed over the plurality of segments, wherein the input is received from the user interface and modified the at least one element to overlay a subset of the plurality of segments;

(g) determining, via one of the one or more computing devices, a new price quote based on the difficulty score associated with the subset of the plurality of segments and the project information and service provider information, stored in a database, of one or more service providers capable of producing and installing the wrap;

(h) transmitting, via one of the one or more computing devices, to the computing customer device the project wrap design and pricing information comprising the new price quote, wherein transmitting the new price quote to the customer computing device updates the user interface to reflect the new price quote;

(i) receiving, via one of the one or more computing devices, a customer input from the user interface displayed on the customer computing device, comprising: confirmation of acceptance or rejection of the project wrap design or the price quote; or a request for modification of the project wrap design and optionally one or more elements to be added to the project wrap design; and (j) if the customer input comprises the confirmation of acceptance, providing, by a project fulfillment module, the project wrap design to a service provider to fulfill the wrap design and installation project; or (k) if the customer input comprises the request for modification, modifying the project wrap design based on the request for modification and optionally the one or more elements; transmitting to the customer computing device a modified project wrap design and adjusted pricing information comprising an adjusted price quote; and repeating step (i).

2. The method of claim 1, wherein receiving the one or more measurements further comprises a customer input comprising dimensions of the installation target.

3. The method of claim 1, further comprising, in response to receiving the input to the three-dimensional representation, determining the difficult score associated with the subset of the plurality of segments based on the input.

4. The method of claim 1, wherein the sensor comprises a LiDAR sensor, a gyroscope, GPS, accelerometer, barometer or a combination thereof.

5. The method of claim 3, wherein the three-dimensional representation comprises a dimensionally accurate model of the installation target based on the one or more measurements.

6. The method of claim 1, further comprising, in response to receiving the input to the three-dimensional representation modifying the project wrap design, performing a customer operation on the project wrap design.

7. The method of claim 6, wherein the customer operation comprises adding, scaling, rotating, cropping, dragging, or mirroring the at least one element or assigning a color to the at least one element.

8. The method of claim 7, wherein the at least one element comprises a logo, a company name, contact information, a URL, a trademark, a slogan, or a combination thereof.

9. The method of claim 7, wherein the at least one element is provided by an asset placement module.

10. The method of claim 1, wherein obtaining the request to initiate a wrap design and installation project comprises receiving the at least one element through a file upload module or through a query of a library.

11. The method of claim 1, wherein generating the three-dimensional representation of the installation target comprises identifying an excluded surface area on the installation target.

12. The method of claim 11, wherein the excluded surface area is excluded from coverage of the project wrap design based on a legal requirement or not being suitable for coverage by the wrap.

13. The method of claim 11, wherein the excluded surface area comprises a physical surface of a window, a tire, an area near or below waterline.

14. The method of claim 1, further comprising choosing a desired wrap material based on a physical surface of the installation target.

15. The method of claim 1, further comprising generating a print layout for the project wrap design based on design or size limitations of the desired wrap material or a printing device, thereby minimizing waste of the desired material and maximizing profit.

16. The method of claim 1, further comprising verifying a color of the project wrap design to ensure that the color is consistent with the color assigned by the customer, optionally based on Pantone coding or CMYK values.

17. The method of claim 1, further comprising selecting the service provider based on proximity to the customer, accolades, a schedule of the service provider, or combinations thereof.

18. The method of claim 1, wherein the service provider information comprises location, capability, capacity, service provider preferences, accolades, maximum printable width, or a combination thereof.

19. The method of claim 14, wherein the desired wrap material comprises a plastic material.

20. The method of claim 1, wherein the installation target comprises a vehicle, an appliance, or an architectural object.

21. The method of claim 20, wherein the vehicle comprises a passenger vehicle, a recreational vehicle, or a commercial vehicle and wherein the architectural object comprises a window, a wall, a floor, a building, an exterior or an interior.

22. The method of claim 1, further comprising determining the pricing information based on the project information comprising complexity of the project wrap design, timeline requirement, size, location, desired material, condition or a combination thereof.

23. The method of claim 22, further comprising determining the pricing information based on a sum of installation costs of the plurality of segments segment is assigned with a difficulty rating, and wherein the installation cost of each of the one or more segments is determined based on the difficulty rating thereof.

24. The method of claim 21, wherein the project information comprises year, make, model, trim, cab type, bed length, vehicle identification number, condition, or a combination thereof of the vehicle, or one or more surface types of the architectural object, the one or more surface types selected from brick, glass, wood, flat, curved, and transparent.

25. The method of claim 24, wherein the condition of the vehicle comprises existing surface condition, a presence of an OEM or aftermarket accessory, an existing surface attachment, or a combination thereof.

26. The method of claim 1, further comprising: receiving an application from the service provider comprising the service provider information; reviewing the application and admitting the service provider; and storing the service provider information in the database.

27. The method of claim 26, wherein the service provider information comprises a link to a calendar of the service provider comprising a schedule of the service provider.

\*  \*  \*  \*  \*